(12) United States Patent
Cheng

(10) Patent No.: US 12,315,500 B2
(45) Date of Patent: May 27, 2025

(54) METHODS FOR EVALUATING THE PRONUNCIATION OF SPEECH

(71) Applicant: Google LLC, Mountain View, CA (US)

(72) Inventor: Jian Cheng, Palo Alto, CA (US)

(73) Assignee: GOOGLE LLC, Mountain View, CA (US)

( * ) Notice: Subject to any disclaimer, the term of this patent is extended or adjusted under 35 U.S.C. 154(b) by 495 days.

(21) Appl. No.: 17/683,168

(22) Filed: Feb. 28, 2022

(65) Prior Publication Data

US 2022/0277737 A1 Sep. 1, 2022

Related U.S. Application Data

(60) Provisional application No. 63/196,622, filed on Jun. 3, 2021, provisional application No. 63/200,324, filed on Mar. 1, 2021.

(51) Int. Cl.
*G10L 15/187* (2013.01)
*G10L 15/04* (2013.01)
*G10L 15/22* (2006.01)

(52) U.S. Cl.
CPC ............ *G10L 15/187* (2013.01); *G10L 15/04* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 8,744,856 B1 * | 6/2014 | Ravishankar | G09B 19/04 704/254 |
| 9,177,558 B2 * | 11/2015 | Chen | G10L 17/26 |

(Continued)

FOREIGN PATENT DOCUMENTS

| | | |
|---|---|---|
| CN | 110718210 A | 1/2020 |
| JP | 2006084966 A | 3/2006 |

(Continued)

OTHER PUBLICATIONS

Li K, Qian X, Meng H. Mispronunciation detection and diagnosis in l2 English speech using multidistribution deep neural networks. IEEE/ACM Transactions on Audio, Speech, and Language Processing. Nov. 22, 2016;25(1): 193-207. (Year: 2016).*

(Continued)

*Primary Examiner* — Jonathan C Kim

(74) *Attorney, Agent, or Firm* — DORITY & MANNING P.A.

(57) ABSTRACT

In a method for quantitatively evaluating a pronunciation of a speaker, an acoustic signal is received from the speaker, which represents an utterance spoken in a language by the speaker. The acoustic signal is segmented into segments at the phone, word or phrase level. The acoustic signal segments are each transcribed by a high fidelity transcriber into high fidelity transcription segments that each comprises a sequence of phones that represents how the native or normative speakers of the language would likely perceive a playback of the acoustic signal segment. Each of the high fidelity transcription segments are compared to a baseline to generate one or more pronunciation scores that evaluate the pronunciation of the speaker. The baseline may be generated by transcribing the acoustic signal into an adapted transcription that comprises a sequence of phones that represents how native or normative speakers of the language would likely speak the utterance.

20 Claims, 29 Drawing Sheets

(56) References Cited

U.S. PATENT DOCUMENTS

| | | | |
|---|---|---|---|
| 9,262,941 B2* | 2/2016 | Chen | G09B 19/06 |
| 9,489,864 B2* | 11/2016 | Evanini | G10L 15/187 |
| 10,354,645 B2* | 7/2019 | Jang | G10L 15/02 |
| 2007/0213982 A1* | 9/2007 | Xi | G09B 19/04 |
| | | | 704/E15.045 |
| 2010/0145698 A1* | 6/2010 | Chen | G09B 19/06 |
| | | | 704/256.1 |
| 2014/0278421 A1* | 9/2014 | Komissarchik | G09B 19/06 |
| | | | 704/251 |
| 2015/0058013 A1* | 2/2015 | Pakhomov | G10L 25/87 |
| | | | 704/243 |
| 2020/0219413 A1* | 7/2020 | Kobashikawa | G09B 5/04 |
| 2021/0049927 A1* | 2/2021 | Saha | G10L 15/187 |
| 2021/0050001 A1* | 2/2021 | Chen | G06N 3/044 |
| 2021/0134277 A1* | 5/2021 | Arora | G10L 15/02 |
| 2021/0319786 A1* | 10/2021 | Kain | G09B 19/04 |
| 2022/0020288 A1* | 1/2022 | Naber | G10L 15/187 |
| 2022/0223066 A1* | 7/2022 | Chen | G10L 15/16 |
| 2022/0277737 A1* | 9/2022 | Cheng | G10L 15/26 |
| 2022/0415308 A1* | 12/2022 | Berisha | G10L 15/30 |

FOREIGN PATENT DOCUMENTS

| | | |
|---|---|---|
| KR | 20050074298 A | 7/2005 |
| WO | 2020/027394 A1 | 2/2020 |

OTHER PUBLICATIONS

Tepperman J, Kazemzadeh A, Narayanan SS. A text-free approach to assessing nonnative intonation. InInterSpeech Aug. 2007 (pp. 2169-2172). (Year: 2007).*

Tu; et al., "Investigating the role of L1 in automatic pronunciation evaluation of L2 speech", Cornell University, arXiv:1807.01738v1 [eess.AS] Jul. 4, 2018, 5 pgs.

Wei; et al., "A new method for mispronunciation detection using support vector machine based on pronunciation space models," Speech Communication (2009), 51:896-905.

Witt, S. M., "Automatic Error Detection in Pronunciation Training: Where we are and where we need to go", IS Adept, Stockholm, Sweden, Jun. 6-8, 2012, 8 pgs.

Witt; et al., "Language learning based on nonnative speech recognition," in Eurospeech, 1997, pp. 633-636.

Witt; et al., "Phone-level pronunciation scoring and assessment for interactive language learning," Speech Communication (2000), 30(2-3):95-108.

Wu; et al., ""Google's Neural Machine Translation System: Bridging the Gap between Human and Machine Translation"", Cornell University, arXiv:1609.08144v2 [cs.CL] Oct. 8, 2016, 23 pgs.

Zhang; et al., "Improving deep neural network acoustic models using generalized maxout networks," in ICASSP, 2014, pp. 215-219.

"The CMU pronouncing dictionary," The CMU Pronouncing Dictionary, retrieved Feb. 25, 2022, from: https://web.archive.org/web/20220205004953/http://www.speech.cs.cmu.edu/cgi-bin/cmudict, 3 pgs.

Ariki; et al., ""English Call System With Functions of Speech Segmentation and Pronunciation Evaluation Using Speech Recognition Technology"", Proc. 7th International Conference on Spoken Language Processing (ICSLP 2002), Sep. 16-20, 2022, 1229-1232.

Arrieta; et al., "Explainable artificial intelligence (XAI): Concepts, taxonomies, opportunities and challenges toward responsible AI," Cornell University, arXiv: 1910.10045v2 [cs.AI] Dec. 26, 2019, 72 pgs.

Baevski; et al., "wav2vec 2.0: A framework for self-supervised learning of speech representations," NeurIPS, 2020, 34th Conference, 12 pgs.

Bernstein; et al., "Automatic evaluation and training in English pronunciation," ICSLP (1990), pp. 1185-1188.

Bernstein; et al., "Validating automated speaking tests," Language Testing (2010), 27(3):355-377.

Black; et al., "Automated Evaluation of Non-Native English Pronunciation Quality: Combining Knowledge- and Data-Driven Features at Multiple Time Scales", Interspeech 2015, Sep. 6-10, 2015, Dresden, Germany, pp. 493-497.

Boulianne; et al., "The KALDI speech recognition toolkit," IEEE-ASRU, 2011, 4 pgs.

Bourland; et al., "Connectionist Speech Recognition: A Hybrid Approach," Kluwer Academic Publishers, Norwell, MA, USA, 1994, 291 pgs.

Brighton; A. P., "Phoneme Recognition by Hidden Markov Modeling", Thesis paper, Jun. 1989, College of Engineering and Technology, Ohio University, 91 pgs.

Cheng, J., "Automatic assessment of prosody in high-stakes English tests," Interspeech, ISCA 2011, pp. 1589-1592.

Cheng, J., "Real-time scoring of an oral reading assessment on mobile devices," Interspeech, 2018, pp. 1621-1625.

Cheng; et al., "A rule-based language model for reading recognition," SLaTE (2009), 4 pgs.

Cheng; et al., "Automatic assessment of the Speech of young English language learners," in Proceedings of the Ninth Workshop on Innovative Use of NLP for Building Educational Applications, 2014, pp. 12-21.

Cheng; et al., "Deep neural network acoustic models for spoken assessment applications," Speech Communication (2015), 73:14-27.

Cheng; et al., "Off-topic detection in automated speech assessment applications," Interspeech, ISCA 2011, pp. 1597-1600.

Cheng; et al., "Towards accurate recognition for children's oral reading fluency," IEEE-SLT, 2010, pp. 91-96.

Cincarek; et al., "Automatic pronunciation scoring of words and sentences independent from the non-native's first language," Computer Speech and Language (2009), 23:65-88.

Dall; et al., "Testing the Consistency Assumption: Pronunciation Variant Forced Alignment in Read and Spontaneous Speech Synthesis", 2016 IEEE International Conference on Acoustics, Speech and Signal Processing (ICASSP), Institute of Electrical and Electronics Engineers (IEEE), pp. 5155-5159.

Dehak; et al., "Front-end factor analysis for speaker verification," IEEE Transactions on Audio, Speech, and Language Processing, 2011, 19(4):788-798.

Franco; et al., "Automatic detection of phone-level mispronunciation for language learning," in Eurospeech, 1999, pp. 851-854.

Franco; et al., "Automatic pronunciation scoring for language instruction," ICASSP, 1997, pp. 1471-1474.

Franco; et al., "Combination of machine scores for automatic grading of pronunciation quality," Speech Communication (2000), 30(2-3): 121-130.

Gao; et al., "A study on robust detection of pronunciation erroneous tendency based on deep neural network," Interspeech, ISCA 2015, pp. 693-696.

Goldman, "EasyAlign: an automatic phonetic alignment tool under Praat", Interspeech'11, 12th Annual Conference of the International Speech Communication Association, 2011, 5 pgs.

Harrison; et al., "Implementation of an extended recognition network for mispronunciation detection and diagnosis in computer-assisted pronunciation training," SLaTE, 2009, pp. 45-48.

Harrison; et al., "Improving mispronunciation detection and diagnosis of learners' speech with context-sensitive phonological rules based on language transfer," in Interspeech, 2008, pp. 2787-2790.

Holden, R.B., "Face validity," in The Corsini Encyclopedia of Psychology (4th ed.), I. B.Weiner and W. E. Craighead, Eds. Hoboken, New Jersey: Wiley, 2010, pp. 637-638.

Hu; et al., "A new DNN-based high quality pronunciation evaluation for computer-aided language learning (CALL)," Proc. of Interspeech, ISCA 2013, pp. 1886-1890.

Hu; et al., "Improved mispronunciation detection with deep neural network trained acoustic models and transfer earning based logistic regression classifiers," Speech Communication (2015), 67:154-166.

To; et al., "Pronunciation error detection method based on error rule clustering using a decision tree," Interspeech, 2005, pp. 173-176.

(56) References Cited

OTHER PUBLICATIONS

Jurafsky; et al., "N-gram Language Models", Speech and Language Processing (2021), Chapter 3, 29 pgs.
Koniaris, C., "An approach to measure pronunciation similarity in second language learning using radial basis function kernel", Proceedings of the third workshop on NLP for computer-assisted language learning, NEALT Proceedings Series 22 / Linkoping Electronic Conference Proceedings, 2014, 107: 74-86.
Li; et al. "An efficient mispronunciation detection method using GLDS-SVM and formant enhanced features," ICASSP, 2009, pp. 4845-4848.
Li; et al. "High performance automatic mispronunciation detection method based on neural network and TRAP features," Interspeech, ISCA 2009, pp. 1911-1914.
Li; et al., "Improving mispronunciation detection for non-native learners with multisource information and LSTM-based deep models," Interspeech, ISCA 2017, pp. 2759-2763.
Li; et al., "Mispronunciation detection and diagnosis in L2 English speech using multidistribution deep neural networks," IEEE/ACM Transactions on Audio, Speech, and Language Processing (2017), 25(1): 193-207.
Linacre, J., "A User's Guide to Winsteps Ministep Rasch-Model Computer Program", winsteps.com (2012), Program Manual 3.74.0, 677 pages.
Metallinou; et al., "Syllable and language model based features for detecting non-scorable tests in spoken language proficiency assessment applications," in Proceedings of the Ninth Workshop on Innovative Use of NLP for Building Educational Applications, 2014, pp. 89-98.
Metallinou; et al., "Using deep neural networks to improve proficiency assessment for children English language earners," Interspeech, ISCA 2014, pp. 1468-1472.
Myford, et al., "Detecting and measuring rater effects using many-facet rasch measurement: Part I," Journal of applied measurement (2003), 4(4):386-422.
Neumeyer; et al. "Automatic text-independent pronunciation scoring of foreign language student speech," in ICSLP, 1996, pp. 1457-1460.
Neumeyer; et al., "Automatic scoring of pronunciation quality," Speech Communication (2000), 30(2-3):83-93.
Nicolao; et al., "Automatic Assessment of English Learner Pronunciation Using Discriminative Classifiers", Acoustics, Speech and Signal Processing (ICASSP), 2015 IEEE International Conference on. 40th IEEE International Conference on Acoustics, Speech and Signal Processing (ICASSP), Apr. 19-24, 2015, Brisbane, Australia,, pp. 5351-5355.
Panayotov; et al., "Librispeech: an ASR corpus based on public domain audio books," ICASSP, 2015, pp. 5206-5210.
Povey; et al., "Semi-orthogonal low-rank matrix factorization for deep neural networks," Interspeech, 2018, pp. 3743-3747.
Qian; et al., "The use of DBN-HMMs for mispronunciation detection and diagnosis in L2 English to support computer-aided pronunciation training," Interspeech, 2012, pp. 775-778.
Ravanelli; et al., "The pytorch-kaldi speech recognition toolkit," ICASSP, 2019, pp. 6465-6469.
Shi; et al., "Context-aware Goodness of Pronunciation for Computer-Assisted Pronunciation Training" Cornell University, arXiv:2008.08647v1 [eess.AS] Aug. 19, 2020, 5 pgs.
Srikanth; et al., "Automatic Pronunciation Evaluation And Mispronunciation Detection Using CMUSphinx", Proceedings of the Workshop on Speech and Language Processing Tools in Education, Dec. 2012, pp. 61-68.
Li; et al., "Mispronunciation Detection and Diagnosis in L2 English Speech Using Multi-Distribution Deep Neural Networks," Human-Computer Communications Laboratory, Department of System Engineering and Engineering Management, The Chinese University of Hong Kong, Hong Kong SAR, China (2014).

\* cited by examiner

600

| Phone | Type | Example | Translation |
|---|---|---|---|
| AA | Vowel | odd | AA D |
| AE | Vowel | at | AE T |
| AH | Vowel | hut | HH AH T |
| AO | Vowel | ought | AO T |
| AW | Vowel | cow | K AW |
| AY | Vowel | Hide | HH AY D |
| B | Consonant | be | B IY |
| CH | Consonant | cheese | CH IY Z |
| D | Consonant | dee | D IY |
| DH | Consonant | thee | DH IY |
| EH | Vowel | Ed | EH D |
| ER | Vowel | hurt | HH ER T |
| EY | Vowel | ate | EY T |
| F | Consonant | fee | F IY |
| G | Consonant | green | G R IY N |
| HH | Consonant | he | HH IY |
| IH | Vowel | it | IH T |
| IY | Vowel | eat | IY T |
| JH | Consonant | gee | JH IY |
| K | Consonant | key | K IY |
| L | Consonant | lee | L IY |
| M | Consonant | me | M IY |
| N | Consonant | knee | N IY |
| NG | Consonant | ping | P IH NG |
| OW | Vowel | oat | OW T |
| OY | Vowel | toy | T OY |
| P | Consonant | pee | P IY |
| R | Consonant | read | R IY D |
| S | Consonant | sea | S IY |
| SH | Consonant | she | SH IY |
| T | Consonant | tea | T IY |
| TH | Consonant | theta | TH EY T AH |
| UH | Vowel | hood | HH UH D |
| UW | Consonant | two | T UW |
| V | Consonant | vee | V IY |
| W | Consonant | we | W IY |
| Y | Consonant | yield | Y IY L D |
| Z | Consonant | zee | Z IY |
| ZH | Consonant | seizure | S IY ZH ER |
| SIL | Non-Consonant-Vowel | | |

Figure 6A

602 Stress Indicators (for Vowel Phones only)

| | |
|---|---|
| 0 | No stress |
| 1 | Primary stress |
| 2 | Secondary stress |

604 Phone Positions

| | |
|---|---|
| _B | beginning |
| _I | internal |
| _E | end |
| _S | standalone |

Figure 6B

| Frame Number | Adapted Phone (118a) | High Fidelity Phone (122a) | Matching Phones? (126) |
|---|---|---|---|
| 128 | N | DH | |
| 129 | N | DH | |
| 130 | N | DH | |
| 131 | N | DH | |
| 132 | N | DH | No |
| 133 | N | AE | |
| 134 | N | AE | |
| 135 | N | AE | |
| 136 | N | AE | |
| 137 | AW | N | |
| 138 | AW | N | |
| 139 | AW | N | |
| 140 | AW | AE | |
| 141 | AW | AE | |
| 142 | AW | AE | |
| 143 | AW | AE | |
| 144 | AW | AE | |
| 145 | AW | AE | |
| 146 | AW | AE | |
| 147 | AW | AE | No |
| 148 | AW | AE | |
| 149 | AW | AE | |
| 150 | AW | AE | |
| 151 | AW | AE | |
| 152 | AW | AE | |
| 153 | AW | AE | |
| 154 | AW | AE | |
| 155 | AW | AE | |
| 156 | AW | AE | |
| 157 | AW | AE | |
| 158 | AW | AE | |
| 159 | DH | AE | |
| 160 | DH | R | |
| 161 | DH | R | |
| 162 | DH | R | No |
| 163 | DH | AH | |
| 164 | DH | AH | |
| 165 | DH | AH | |

Phone-by-Phone Phone Matching Analysis

Figure 13A

|  | 118a | 122a | 126 |
|---|---|---|---|
| Frame Number | Adapted Phone | High Fidelity Phone | Matching Phones? |
| 166 | AH | AH | Yes |
| 167 | AH | AH | |
| 168 | AH | AH | |
| 169 | AH | AH | |
| 170 | AH | AH | |
| 171 | AH | AH | |
| 172 | AH | AH | |
| 173 | AH | AH | |
| 174 | AH | AH | |
| 175 | AH | AH | |
| 176 | W | AH | No |
| 177 | W | AH | |
| 178 | W | L | |
| 179 | W | L | |
| 180 | W | L | |
| 181 | W | L | |
| 182 | W | L | |
| 183 | W | L | |
| 184 | W | L | |
| 185 | EY | L | No |
| 186 | EY | EH | |
| 187 | EY | EH | |
| 188 | EY | EH | |
| 189 | EY | EH | |
| 190 | EY | EH | |
| 191 | EY | EH | |
| 192 | EY | EH | |
| 193 | EY | EH | |
| 194 | EY | EH | |
| 195 | EY | EH | |
| 196 | EY | EH | |
| 197 | EY | EH | |
| 198 | EY | EH | |
| 199 | EY | S | |
| 200 | EY | S | |
| 201 | EY | S | |

Phone-by-Phone Phone Matching Analysis

Figure 13B

Frame-by-Frame Phone Matching Analysis

| Frame Number | Adapted Phone 118a | High Fidelity Phone 122a | Same Phone for Same Frame? 126 |
|---|---|---|---|
| 128 | N | DH | No |
| 129 | N | DH | No |
| 130 | N | DH | No |
| 131 | N | DH | No |
| 132 | N | DH | No |
| 133 | N | AE | No |
| 134 | N | AE | No |
| 135 | N | AE | No |
| 136 | N | AE | No |
| 137 | AW | N | No |
| 138 | AW | N | No |
| 139 | AW | N | No |
| 140 | AW | AE | No |
| 141 | AW | AE | No |
| 142 | AW | AE | No |
| 143 | AW | AE | No |
| 144 | AW | AE | No |
| 145 | AW | AE | No |
| 146 | AW | AE | No |
| 147 | AW | AE | No |
| 148 | AW | AE | No |
| 149 | AW | AE | No |
| 150 | AW | AE | No |
| 151 | AW | AE | No |
| 152 | AW | AE | No |
| 153 | AW | AE | No |
| 154 | AW | AE | No |
| 155 | AW | AE | No |
| 156 | AW | AE | No |
| 157 | AW | AE | No |
| 158 | AW | AE | No |
| 159 | DH | AE | No |
| 160 | DH | R | No |
| 161 | DH | R | No |
| 162 | DH | R | No |
| 163 | DH | AH | No |
| 164 | DH | AH | No |
| 165 | DH | AH | No |

Figure 14A

Frame-by-Frame Phone Matching Analysis

| Frame Number (118a) | Adapted Phone (122a) | High Fidelity Phone (126) | Same Phone for Same Frame? |
|---|---|---|---|
| 166 | AH | AH | Yes |
| 167 | AH | AH | Yes |
| 168 | AH | AH | Yes |
| 169 | AH | AH | Yes |
| 170 | AH | AH | Yes |
| 171 | AH | AH | Yes |
| 172 | AH | AH | Yes |
| 173 | AH | AH | Yes |
| 174 | AH | AH | Yes |
| 175 | AH | AH | Yes |
| 176 | W | AH | No |
| 177 | W | AH | No |
| 178 | W | L | No |
| 179 | W | L | No |
| 180 | W | L | No |
| 181 | W | L | No |
| 182 | W | L | No |
| 183 | W | L | No |
| 184 | W | L | No |
| 185 | EY | L | No |
| 186 | EY | EH | No |
| 187 | EY | EH | No |
| 188 | EY | EH | No |
| 189 | EY | EH | No |
| 190 | EY | EH | No |
| 191 | EY | EH | No |
| 192 | EY | EH | No |
| 193 | EY | EH | No |
| 194 | EY | EH | No |
| 195 | EY | EH | No |
| 196 | EY | EH | No |
| 197 | EY | EH | No |
| 198 | EY | EH | No |
| 199 | EY | S | No |
| 200 | EY | S | No |
| 201 | EY | S | No |

Figure 14B 118a      134
                                     ↓         ↓

| Frame Number | Adapted Phone | Posterior Probability | Log(Posterior Probability) |
|---|---|---|---|
| 128 | N | 0.00034 | -8 |
| 129 | N | 0.00034 | -8 |
| 130 | N | 0.00034 | -8 |
| 131 | N | 0.00034 | -8 |
| 132 | N | 0.00034 | -8 |
| 133 | N | 0.00034 | -8 |
| 134 | N | 0.00034 | -8 |
| 135 | N | 0.00034 | -8 |
| 136 | N | 0.00034 | -8 |
| 137 | AW | 0.00034 | -8 |
| 138 | AW | 0.00034 | -8 |
| 139 | AW | 0.00034 | -8 |
| 140 | AW | 0.00034 | -8 |
| 141 | AW | 0.00034 | -8 |
| 142 | AW | 0.00034 | -8 |
| 143 | AW | 0.00034 | -8 |
| 144 | AW | 0.00034 | -8 |
| 145 | AW | 0.00034 | -8 |
| 146 | AW | 0.00034 | -8 |
| 147 | AW | 0.00034 | -8 |
| 148 | AW | 0.00034 | -8 |
| 149 | AW | 0.00034 | -8 |
| 150 | AW | 0.00034 | -8 |
| 151 | AW | 0.00034 | -8 |
| 152 | AW | 0.00034 | -8 |
| 153 | AW | 0.00034 | -8 |
| 154 | AW | 0.00034 | -8 |
| 155 | AW | 0.00034 | -8 |
| 156 | AW | 0.00034 | -8 |
| 157 | AW | 0.00034 | -8 |
| 158 | AW | 0.00034 | -8 |
| 159 | DH | 0.00034 | -8 |
| 160 | DH | 0.00034 | -8 |
| 161 | DH | 0.00034 | -8 |
| 162 | DH | 0.00034 | -8 |
| 163 | DH | 0.00034 | -8 |
| 164 | DH | 0.00034 | -8 |
| 165 | DH | 0.00034 | -8 |

Frame-by-Frame Log Posterior Probability Analysis

Figure 15A

Frame-by-Frame Log Posterior Probability Analysis

| Frame Number | Adapted Phone (118a) | Posterior Probability (134) | Log(Posterior Probability) |
|---|---|---|---|
| 166 | AH | 1.00000 | 0 |
| 167 | AH | 1.00000 | 0 |
| 168 | AH | 1.00000 | 0 |
| 169 | AH | 1.00000 | 0 |
| 170 | AH | 1.00000 | 0 |
| 171 | AH | 1.00000 | 0 |
| 172 | AH | 1.00000 | 0 |
| 173 | AH | 1.00000 | 0 |
| 174 | AH | 1.00000 | 0 |
| 175 | AH | 0.00034 | -8 |
| 176 | W | 0.00034 | -8 |
| 177 | W | 0.00034 | -8 |
| 178 | W | 0.00034 | -8 |
| 179 | W | 0.00034 | -8 |
| 180 | W | 0.00034 | -8 |
| 181 | W | 0.00034 | -8 |
| 182 | W | 0.00034 | -8 |
| 183 | W | 0.00034 | -8 |
| 184 | W | 0.00034 | -8 |
| 185 | EY | 0.00034 | -8 |
| 186 | EY | 0.00034 | -8 |
| 187 | EY | 0.00034 | -8 |
| 188 | EY | 0.00034 | -8 |
| 189 | EY | 0.00034 | -8 |
| 190 | EY | 0.00034 | -8 |
| 191 | EY | 0.00034 | -8 |
| 192 | EY | 0.00034 | -8 |
| 193 | EY | 0.00034 | -8 |
| 194 | EY | 0.00034 | -8 |
| 195 | EY | 0.00034 | -8 |
| 196 | EY | 0.00034 | -8 |
| 197 | EY | 0.00034 | -8 |
| 198 | EY | 0.00034 | -8 |
| 199 | EY | 0.00034 | -8 |
| 200 | EY | 0.00034 | -8 |
| 201 | EY | 0.00034 | -8 |

Figure 15B

|  | Intermediate Values | | | | | Pronunciation Scores | | |
|---|---|---|---|---|---|---|---|---|
|  | Number of Phones | Number of Frames | Number of Matching Phones | Number of Frames with Matching Phones | Total Log Posterior Probability | PPM | PFM | LPP |
| Now the way | 6 | 74 | 1 | 10 | -512 | 0.17 | 0.14 | -6.9 |
| Look at it | 7 | 88 | 1 | 12 | -598 | 0.14 | 0.14 | -6.8 |
| We didn't waste | 12 | 80 | 2 | 9 | -568 | 0.17 | 0.11 | -7.1 |
| Anything | 6 | 110 | 3 | 29 | -642 | 0.5 | 0.26 | -5.8 |
| Across all phrases | 31 | 352 | 7 | 60 | -2320 | 0.23 | 0.17 | -6.6 |

Figure 16

| Scale | Criteria |
|---|---|
| 5 | Very native-like and completely intelligible. All phoneme segments and lexical stress patterns are good. |
| 4 | Easily intelligible, with correct phonological forms, but some clearly non-native segmental patterns. |
| 3 | Has some obvious segmental errors that render a few words difficult to understand. |
| 2 | Many segmental errors and a few errors in lexical stress, but most words intelligible in context. |
| 1 | Pervasive segmental and/or lexical stress errors, or fully characteristic of another language; thus, largely unintelligible. |
| 0 | Insufficient or irrelevant sample for rating. |

Figure 17

METHODS FOR EVALUATING THE PRONUNCIATION OF SPEECH

RELATED APPLICATIONS

This application is a non-provisional patent application of and claims priority to U.S. Provisional Application No. 63/200,324, filed 1 Mar. 2021, and U.S. Provisional Application No. 63/196,622, filed 3 Jun. 2021, both of which are incorporated by reference herein.

FIELD OF THE INVENTION

The present invention relates to a method and system for evaluating the speech of a speaker, more specifically, to the evaluation of the pronunciation of the speech of the speaker.

BACKGROUND

The intelligibility of speech, in which pronunciation plays a vital role, is an important part of spoken communication. For speakers who have poor pronunciation, feedback to the user is needed to assist the speakers to improve their pronunciation. In the past, such feedback has been provided through language instructors, as well as through computer based assessments, in which an utterance is analyzed by a computer in order to provide the speaker with a pronunciation score. Described herein is an objective pronunciation assessment tool to automatically generate one or more pronunciation scores from an utterance that have a high degree of correlation to human generated pronunciation scores.

SUMMARY OF THE INVENTION

In accordance with one embodiment of the invention, a method for computing one or more pronunciation scores relies upon statistics generated from individual segments of an acoustic signal. In such method, an acoustic signal is first received from a speaker, the acoustic signal representing an utterance spoken in some particular language by the speaker. An adapted transcription of the acoustic signal may be generated by (i) an acoustic model trained using speech signals from both native and non-native speakers of the language and (ii) a language model (e.g., a word level language model or a word-piece level language model). The adapted transcription comprises a sequence of phones that represents how native speakers of the language would likely speak the utterance.

Segment boundaries are identified in the adapted transcription, and based on these segment boundaries, the adapted transcription is segmented into a plurality of adapted transcription segments, and the acoustic signal is segmented into a plurality of acoustic signal segments. Each of the acoustic signal segments temporally corresponds to one of the adapted transcription segments.

For each acoustic signal segment, a high fidelity transcription segment is generated by (i) an acoustic model trained using speech signals from native speakers of the language, and (ii) a phone sequence model (e.g., a statistical phone sequence model or a rule based phone sequence model). The high fidelity transcription segment comprises a sequence of phones that represents how the native speakers of the language would likely perceive a playback of the acoustic signal segment. Statistics for the acoustic signal segment are computed based on at least one of the high fidelity transcription segment and its corresponding adapted transcription segment. Finally, one or more pronunciation scores are computed by aggregating the statistics computed for the plurality of acoustic signal segments, the pronunciation scores evaluating the pronunciation of the speaker. The pronunciation scores may include one or more of a percent phone match (PPM), a percent frame match (PFM), and a frame normalized log posterior probability (LPP). Validation studies have shown that such pronunciation scores have a high correlation with human generated pronunciation scores.

In accordance with another embodiment of the invention, a method for computing one or more pronunciation scores does not involve segmenting the acoustic signal, but rather involves time windowing the acoustic signal. In such method, an acoustic signal is first received from a speaker, the acoustic signal representing an utterance spoken in some particular language by the speaker. An adapted transcription of the acoustic signal may be generated by (i) an acoustic model trained using speech signals from both native and non-native speakers of the language and (ii) a language model (e.g., a word level language model or a word-piece level language model). The adapted transcription comprises a sequence of phones that represents how native speakers of the language would likely speak the utterance. Window boundaries are identified in the adapted transcription, and based on these window boundaries, a time window is applied to the adapted transcription to produce a time windowed version thereof, and a time window is applied to the acoustic signal to produce a time windowed version thereof.

A high fidelity transcription of the windowed acoustic signal may be generated by (i) an acoustic model trained using speech signals from native speakers of the language, and (ii) a phone sequence model (e.g., a statistical phone sequence model or a rule based phone sequence model). The high fidelity transcription comprises a sequence of phones that represents how the native speakers of the language would likely perceive a playback of the acoustic signal. Statistics for the windowed acoustic signal are computed based on at least one of the high fidelity transcription and the windowed adapted transcription. Finally, one or more pronunciation scores (e.g., a PPM, a PFM, and frame normalized LPP) are computed based on the statistics computed for the windowed acoustic signal, the pronunciation scores evaluating the pronunciation of the speaker.

These and other embodiments of the invention are more fully described in association with the drawings below.

BRIEF DESCRIPTION OF THE DRAWINGS

FIG. 6A depicts a table of phones from the Carnegie Mellon University (CMU) pronouncing dictionary.

FIG. 6B depicts phonetic properties of phones, including phone positions for vowel or consonant phones, and stress indicators for vowel phones.

FIGS. 13A-13B depict an example illustrating the phone matching analysis performed by the feature comparison module on a phone-by-phone basis, in accordance with one embodiment of the invention.

FIGS. 14A-14B depict an example illustrating the phone matching analysis performed by the feature comparison module on a frame-by-frame basis, in accordance with one embodiment of the invention.

FIGS. 15A-15B depict an example illustrating the posterior probability analysis performed by the posterior probability module on a frame-by-frame basis, in accordance with one embodiment of the invention.

FIG. 16 depicts a table with intermediate values, phrase level pronunciation scores and these same scores averaged over all phrases, in accordance with one embodiment of the invention.

FIG. 17 depicts a scoring rubric used by human scorers to score utterances, in accordance with one embodiment of the invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

Figure 1:
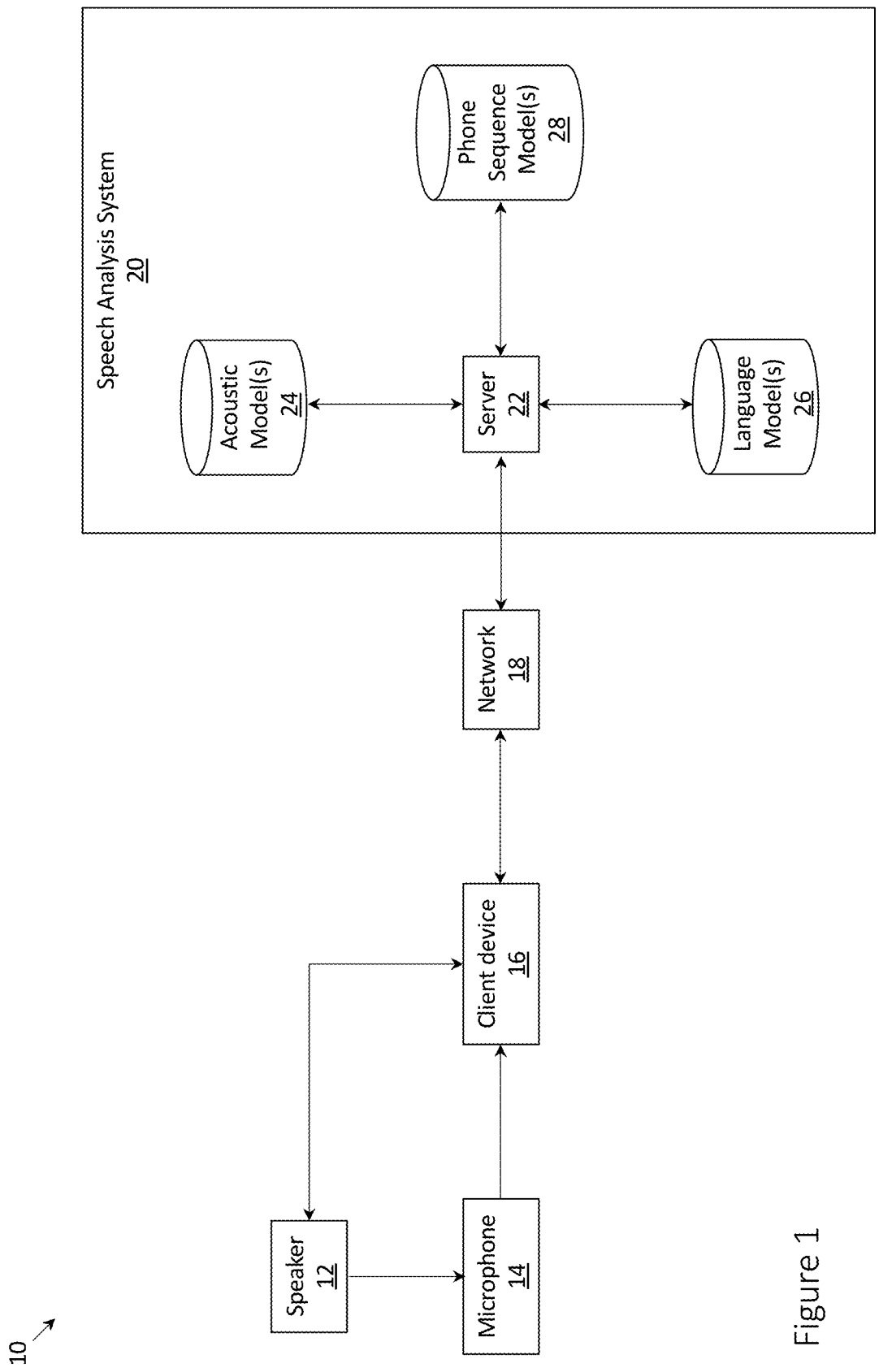
FIG. 1 depicts a system diagram illustrating the communication pathway between a speaker and a speech analysis system, in accordance with one embodiment of the invention.

FIG. 1 depicts a system diagram 10 that shows the communication pathway between a speaker 12 and a speech analysis system 20. The speech of the speaker 12 may be captured by a microphone 14, which converts the acoustic signal in the form of pressure variations into an acoustic signal represented as an electrical signal with a varying amplitude. Microphone 14 may also include an analog to digital converter (ADC) which converts the acoustic signal represented as an electrical signal with a varying amplitude (i.e., analog values) into an acoustic signal represented by digital values. Unless otherwise specified, reference to an acoustic signal will implicitly refer to an acoustic signal represented by digital values in the remainder of the description.

The acoustic signal may be received from the microphone 14 by a client device 16, which may include one or more of a laptop computer, a tablet computer, a smart phone, etc. The client device 16 may be communicatively coupled to a speech analysis system 20 via a network 18. The network 18 may be any form of wireless and/or wired communications means and, in some cases, may be individual communications links, or one or more communications networks, including private networks, public networks and/or virtual private networks over public networks. The speaker 12 may also communicate with the client device 16, for example to initiate a speech scoring session, to receive one or more pronunciation scores generated by the speech analysis system 20, etc.

The speech analysis system 20 may comprise a server 22 that is communicatively coupled to one or more acoustic models 24, one or more language models 26 and one or more phone sequence models 28. The acoustic models 24 may include one or more of an acoustic model trained using speech signals from native speakers, an acoustic model trained using speech signals from non-native speakers, or an acoustic model trained using speech signals from native and non-native speakers. The acoustic models 24 may include one or more of an acoustic model trained using speech signals from normative speakers, an acoustic model trained using speech signals from non-normative speakers, or an acoustic model trained using speech signals from normative and non-normative speakers. Normative speakers generally refer to speakers who speak in accordance with an accepted or prescribed norm, and may include native speakers and non-native speakers. Non-normative speakers generally refer to speakers who do not speak in accordance with the accepted or prescribed norm, and may include native speakers and non-native speakers.

The language models 26 may include one or more a word level language model or a word-piece level language model. A word level language model (e.g., common examples include the bi-gram model and the tri-gram model) models the sequential relationships between words in a language, whereas a word-piece level language model is generated using a data-driven approach to maximize the language-model likelihood of training data, given an evolving word definition. Additional details regarding a word-piece level language model may be found in Yonghui Wu et al. "Google's Neural Machine Translation System: Bridging the Gap between Human and Machine Translation" arXiv: 1609.08144v2, 8 Oct. 2016.

The phone sequence models 28 may include one or more of a statistical phone sequence model and a rule-based phone sequence model (RBPSM). A more detailed description of the phone sequence models 28 will be provided below in FIGS. 4A and 4B.

Figure 2A:
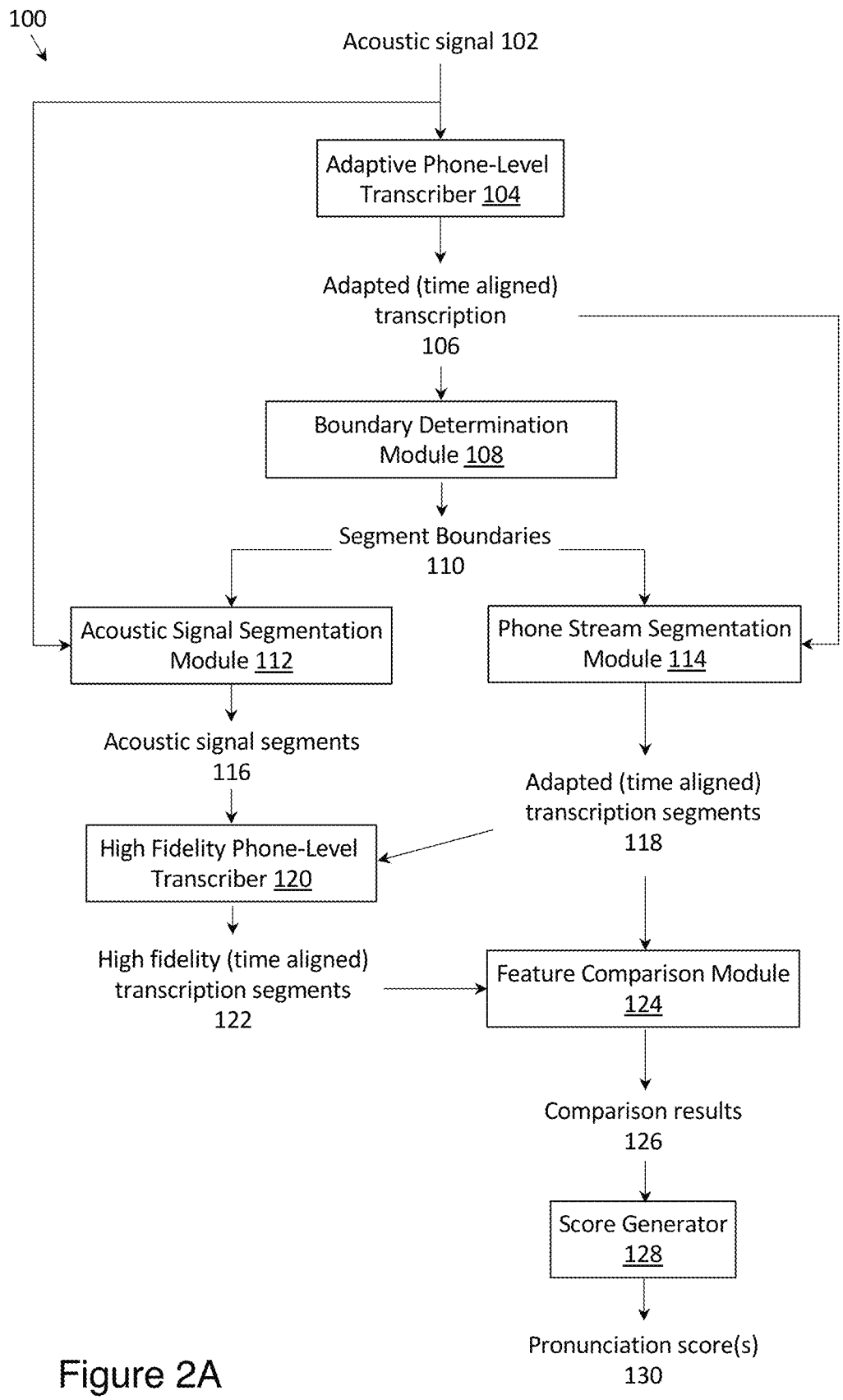
FIG. 2A depicts a speech analysis system for generating a pronunciation score from segments of an acoustic signal, in accordance with one embodiment of the invention.

FIG. 2A depicts a system 100 that may be implemented on server 22 in order to generate a pronunciation score 130 for an acoustic signal 102 representing an utterance spoken in a language by the speaker 12. In the examples described herein, the language is assumed to be American English, but it is understood that the techniques described herein may be applied to other languages such as Chinese, Japanese, German, French, Arabic, etc.

The speaker 12 may be a native or non-native speaker of the language. A native speaker of the language refers to a speaker for which the language is the speaker's first learned language, or among one of the languages learned during the speaker's childhood. A non-native speaker of the language refers to a speaker for which the language is the speaker's second or later learned language, or among one of the languages learned after the speaker's childhood. The discussion below will generally assume that the speaker 12 is a non-native speaker; however, the techniques described herein will still be applicable if the speaker 12 is a native speaker. The speaker 12 may also be a normative or non-normative speaker of the language.

A high level overview of the pronunciation assessment proceeds as follows. The acoustic signal 102 (corresponding to an utterance spoken by the speaker 12) is transcribed into a phone stream using a first acoustic model trained using speech from native (or normative) speakers of the language. Such a phone stream seeks to capture how the utterance would be perceived by native (or normative) speakers of the language, and if the speaker 12 is not proficient in the language, will likely contain alterations from how the same utterance would be spoken by the native (or normative) speaker. These alterations may include missed phones, added phones, substituted phones, altered stress locations, etc. In the description below, such transcription will be referred to as a "high-fidelity transcription," as it attempts to represent the acoustic signal 102 with a sequence of phones that are as true to the speaker's utterance as possible.

In order to assess the speaker's pronunciation, it is necessary to compare the high-fidelity transcription against a baseline. However, the instant speech analysis system does not rely upon any prior knowledge of what the speaker 12 will say (i.e., does not assume access to a script in the instance that the speaker 12 is reading from a script). Therefore, the speech analysis system 20 must also attempt to generate the baseline against which the high-fidelity transcription is compared. At a high level, the baseline may be generated by transcribing the acoustic signal 102 using a second acoustic model that is trained using speech signals from both native and non-native speakers of the language (or speech signals from both normative and non-normative speakers of the language). For instance, the second acoustic model may be trained using speech signals from one hundred native speakers of American English and one hundred non-native speakers of American English. To clarify, the native language of the non-native speakers may differ. For instance, of the one hundred non-native speakers, the native language of twenty-five of the speakers could be German, the native language of twenty-five of the speakers could be French, and the native language of fifty of the speakers could be Japanese. To further clarify, the training of the second acoustic model may or may not be trained using speech from the speaker 12 whose speech is being evaluated.

The intuition is that the second acoustic model will be able to better infer the "intended" phones of the speaker's utterance as compared to the first acoustic model, since it is trained using speech signals from both native and non-native speakers of the language (or speech signals from both normative and non-normative speakers of the language). For example, if the speaker's pronunciation of the word "dog" is closer to "dig," the first acoustic model will produce a high-fidelity sequence of phones [D IH G] that represents "dig," whereas the second acoustic model will produce an adapted sequence of phones [D AO G] that represents "dog." The word "adapted" is used in the sense that there is some adaptation (or conversion) from what the speaker 12 said to how native (or normative) speakers would likely pronounce the words spoken by the speaker 12. Therefore, in the description that follows, the baseline transcription (against which the high-fidelity transcription is compared) may also be called the adapted transcription. Once the high-fidelity transcription and the adapted transcription have been determined, the pronunciation score may be computed by evaluating the similarities and differences between the high-fidelity transcription (i.e., what the speaker said) and the adapted transcription (i.e., the baseline).

An assumption in the present approach is that the alterations (e.g., commonly missed phones, added phones, substituted phones, altered stress locations, etc.) present in the utterance of the speaker 12 being evaluated by the speech analysis system 20 are well represented in the speech used to train the second acoustic model. If this is not so, the adapted transcription might not be a good representation of what the speaker meant or "intended" to say. Even if this assumption is met, it is noted that the adapted transcription and hence the baseline might occasionally contain mistakes, as the adapted transcription is only an inference of what the speaker intended to say, and an inference in general may contain errors. For instance, there would be an error in the adapted transcription if the word "dog" were read as "dig" [D IH G] by the speaker 12, and the adapted phones were inferred by the second acoustic model to be [P IH G] corresponding to the word "pig." Therefore, the number of errors in the adapted transcription (i.e., the baseline) should be minimized in order to generate an accurate pronunciation score. Having now presented the high-level overview, a mid-level overview of FIGS. 2A-2D will now be presented, followed by a detailed description of FIGS. 2A-2D. The description will follow the general concepts of the high-level overview, but the details will differ due to optimization and implementational details that have not been covered in the high-level overview, such as the use of segmentation, language models, phone sequence models, forced alignment, etc.

FIG. 2A depicts a system 100 that computes a pronunciation score 130 based on segments 116 of the acoustic signal 102. The same observation holds true for the system 150 depicted in FIG. 2B. In contrast, segmentation is not used in the systems 200 and 250 depicted in FIGS. 2C and 2D, respectively. Therefore, one key difference in the systems of FIGS. 2A and 2B from the above high-level overview is that the speaker's pronunciation is evaluated on a segment-by-segment basis, and an overall pronunciation score for the speaker's utterance is calculated as an aggregation of the statistics computed for each individual segment. In contrast, the systems 200 and 250 depicted in FIGS. 2C and 2D, respectively, operate similarly to the high-level overview in that an utterance-level analysis is performed on the acoustic signal 102 to compute the pronunciation score 130.

It is noted that there are also several considerations for performing the segmentation. First, there is a choice of what "level" (i.e., how granular) to segment the acoustic signal 102 (i.e., whether to segment the acoustic signal 102 into individual phones, words or phrases). Through experimentation, it was discovered that the segmentation at the phrase level leads to the most accurate pronunciation scores. Therefore, the preferred embodiment utilizes a phrase-level segmentation of the acoustic signal 102, while it is noted that a phone-level or word-level segmentation of the acoustic signal 102 can still provide meaningful results.

Figure 2B:
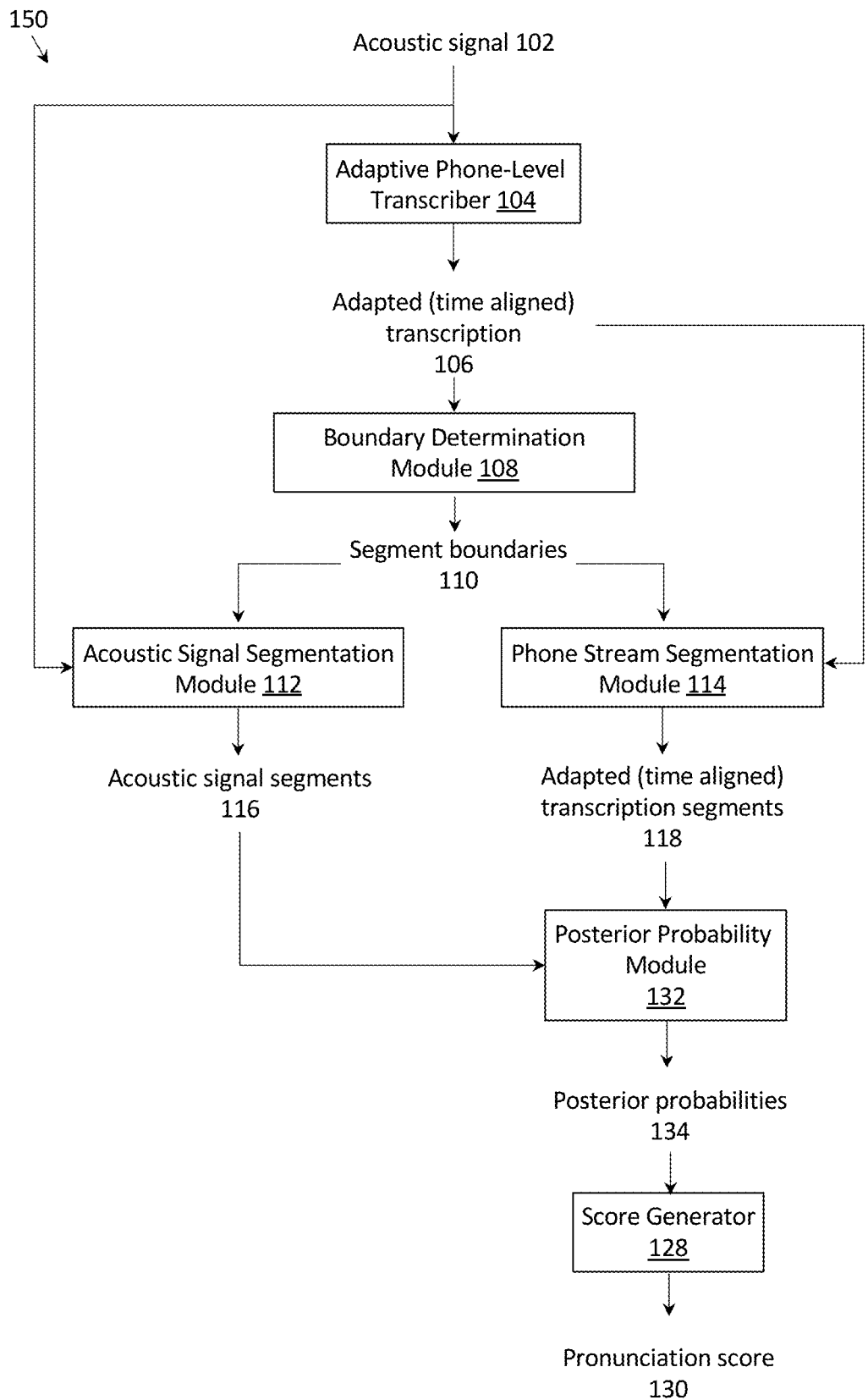
FIG. 2B depicts a speech analysis system for generating a pronunciation score from segments of an acoustic signal, in accordance with one embodiment of the invention.

Second, there is also a choice of whether to use the segment boundaries provided in the adapted transcription or the high-fidelity transcription. In the systems of FIGS. 2A-2B, the acoustic signal 102 is segmented based on boundaries provided in the adapted transcription 106. In other words, the adapted transcription 106 reveals temporal boundaries for segmenting the phone stream into individual phones, individual words and/or individual phrases, and the acoustic signal 102 is segmented based on those boundaries. The impacts of segmentation (i.e., why it is useful) will be described once the system 100 depicted in FIG. 2A has been discussed. A detailed description of FIG. 2A is now provided.

As depicted in FIG. 2A, an acoustic signal 102 (representing an utterance of the speaker 12 spoken in a language) is received by both the adaptive phone-level transcriber 104 and the acoustic signal segmentation module 112. The adaptive phone-level transcriber 104 generates an adapted (time aligned) transcription 106 of the acoustic signal 102, which comprises a sequence of phones that represents how native (or normative) speakers of the language would likely speak the utterance (i.e., the baseline). The "time alignment" aspect refers to each of the phones being tagged with temporal information. Typically, each phone is tagged with two values, the first value specifying a starting frame for the phone, and the second value specifying the duration of the phone in terms of the number of frames (i.e., each frame typically defined to span 10 milliseconds). The "time alignment" aspect will be illustrated in the examples to follow. The details of the adaptive phone-level transcriber 104 are presented in FIG. 3.

The adapted (time aligned) transcription 106 is provided to boundary determination module 108 and phone stream segmentation module 114. Boundary determination module 108 returns segment boundaries 110 within the adapted transcription 106. The boundaries 110 may be segment boundaries explicitly provided in the adapted transcription 106 (e.g., phone and word boundaries) or segment boundaries that are inferred from the adapted transcription 106 (e.g., phrase boundaries). The example in FIG. 9 describes the identification of phone, word, and phrase boundaries in more detail.

Acoustic signal segmentation module 112 segments the acoustic signal 102 into a plurality of acoustic signal segments 116 based on the segment boundaries 110 provided by the boundary determination module 108. Similarly, phone stream segmentation module 114 segments the adapted (time aligned) transcription 106 into a plurality of adapted (time aligned) transcription segments 118 based on the segment boundaries 110 provided by the boundary determination module 108. Since the same segment boundaries 110 are utilized by the acoustic signal segmentation module 112 and the phone stream segmentation module 114, each acoustic signal segment 116 temporally corresponds to one of the adapted transcription segments 118. For example, if the first acoustic signal segment 116 consists of the first 150 ms of the acoustic signal 102, the first adapted transcription segment 118 will consist of the adapted phone stream corresponding to this 150 ms of the acoustic signal. In the discussion to follow, each acoustic signal segment 116 will be evaluated based on its corresponding adapted transcription segment 118 (i.e., baseline).

The high fidelity phone-level transcriber 120 generates a high fidelity (time aligned) transcription segment 122 corresponding to each of the acoustic signal segments 116. Each high fidelity transcription segment 122 comprises a sequence of phones that represents how the native (or normative) speakers of the language would likely perceive a playback of the acoustic signal segment 116. The details of the high fidelity phone-level transcriber 120 are presented in FIG. 5, including an explanation of why the adapted transcription segments 118 are provided to the high fidelity phone-level transcriber 120.

The impacts of segmentation on the high fidelity phone-level transcriber 120 are now explained. Suppose a 100 ms segment of an acoustic signal were transcribed by the high fidelity phone-level transcriber 120. Also suppose that the same 100 ms segment were divided into two segments (first segment being the first 50 ms and second segment being the last 50 ms). The output (i.e., the phone stream) of high fidelity phone-level transcriber 120 taking the 100 ms segment as input would likely differ from the output generated by concatenating the output of the high fidelity phone-level transcriber 120 taking the two 50 ms segments as input. The reason is that there would likely be dependencies between the first 50 ms segment and the second 50 ms segment. For instance, if the first 50 ms segment concerns the topic of weather, is more likely that the last 50 ms segment will contain words such as rain, snow, wind, etc. The larger 100 ms segment can take these dependencies into account, whereas the more granular 50 ms segments are unable to take these dependencies into account. In general, the ability to take more dependencies into account leads to a more accurate transcription, so that is why a phrase-level segmentation is preferred over a word- or phone-level transcription.

One may now wonder why segmentation is performed at all, in that it would appear that the transcription of the entire utterance at once would take into account even more dependencies and lead to an even more accurate transcription. It turns out that utterances typically contain pauses in the speaker's speech, which may include breathing sounds, swallowing sounds, coughing sounds, laughter, background noise, etc. and such non-consonant-vowel sounds can lead to errors in the transcription. Therefore, while an utterance-level transcription could be utilized (and in fact is described in FIGS. 2C and 2D), there is a "goldilocks" length of segmentation that achieves the best results (i.e., a segment that is not too short and not too long). Such length of segmentation is the phrase level segmentation.

Feature comparison module 124 compares features from each high fidelity transcription segment 122 (what the speaker said) with features from a corresponding adapted transcription segment 118 (the baseline). The comparison results 126 may include a determination of whether a phone in the high fidelity transcription segment 122 temporally coincides with the same phone in the adapted transcription segment 118, and a determination of whether a frame in the high fidelity transcription segment 122 and the corresponding frame in the adapted transcription segment 118 have a matching phone. An example of the comparison results 126 is provided in FIGS. 13A-13B and 14A-14B.

Finally, score generator 128 may aggregate the comparison results 126 into a pronunciation score 130. For example, the score generator 128 may divide the total number of temporally coinciding phones by the total number of phones, and/or may divide the total number of matching frames by the total number of frames to compute a pronunciation score 130. An example of computing pronunciation scores 130 from the comparison results 126 is provided in FIG. 16.

Figure 5:
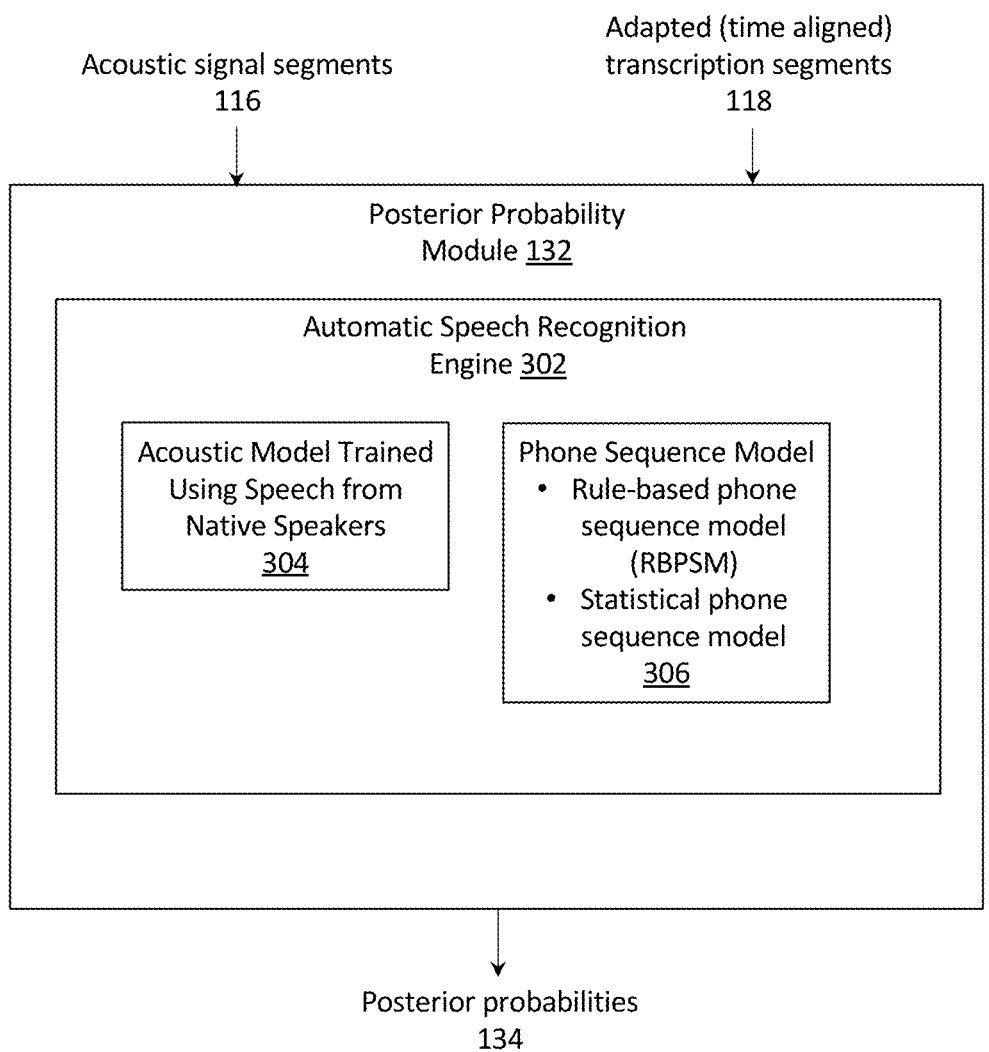
FIG. 5 depicts a posterior probability module for generating posterior probabilities of adapted phones, in accordance with one embodiment of the invention.

FIG. 2B depicts system 150 with certain similarities as system 100 for computing a pronunciation score 130. Both perform a similar segmentation of the acoustic signal 102. However, system 150 does not follow the logic of comparing a high-fidelity transcription segment (what the user said) with an adapted transcription segment (a baseline). Instead, a posterior probability module 132 takes the place of feature comparison module 124. The posterior probability module 132 computes a posterior probability of each phone of the adapted transcription segment (i.e., the probability of each phone of the adapted transcription segment conditioned on observations of the corresponding acoustic signal segment, an acoustic model trained with speech from the native (or normative) speakers of the language, a phone sequence model and the frame of the phone). Intuitively, each posterior probability reveals how confident the system is with each determination of the adapted phone of the speaker 12. If the system is highly confident, the posterior probability will be close to 1. If the system is not very confident, the posterior probability will be close to 0. The posterior probability module 132 may output a posterior probability 134 on a frame-by-frame basis. Additional details of the posterior probability module 132 are depicted in FIG. 5. Examples posterior probabilities 134 are provided in FIGS. 15A-15B.

Finally, score generator 128 may aggregate the posterior probabilities 134 into a pronunciation score 130. For example, the score generator 128 may compute the sum of the log of each of the posterior probabilities and divide that sum by the total number of frames to arrive at the pronunciation score 130. An example of computing the pronunciation score 130 from the posterior probabilities is provided in FIGS. 15A-15B and 16.

Figure 2C:
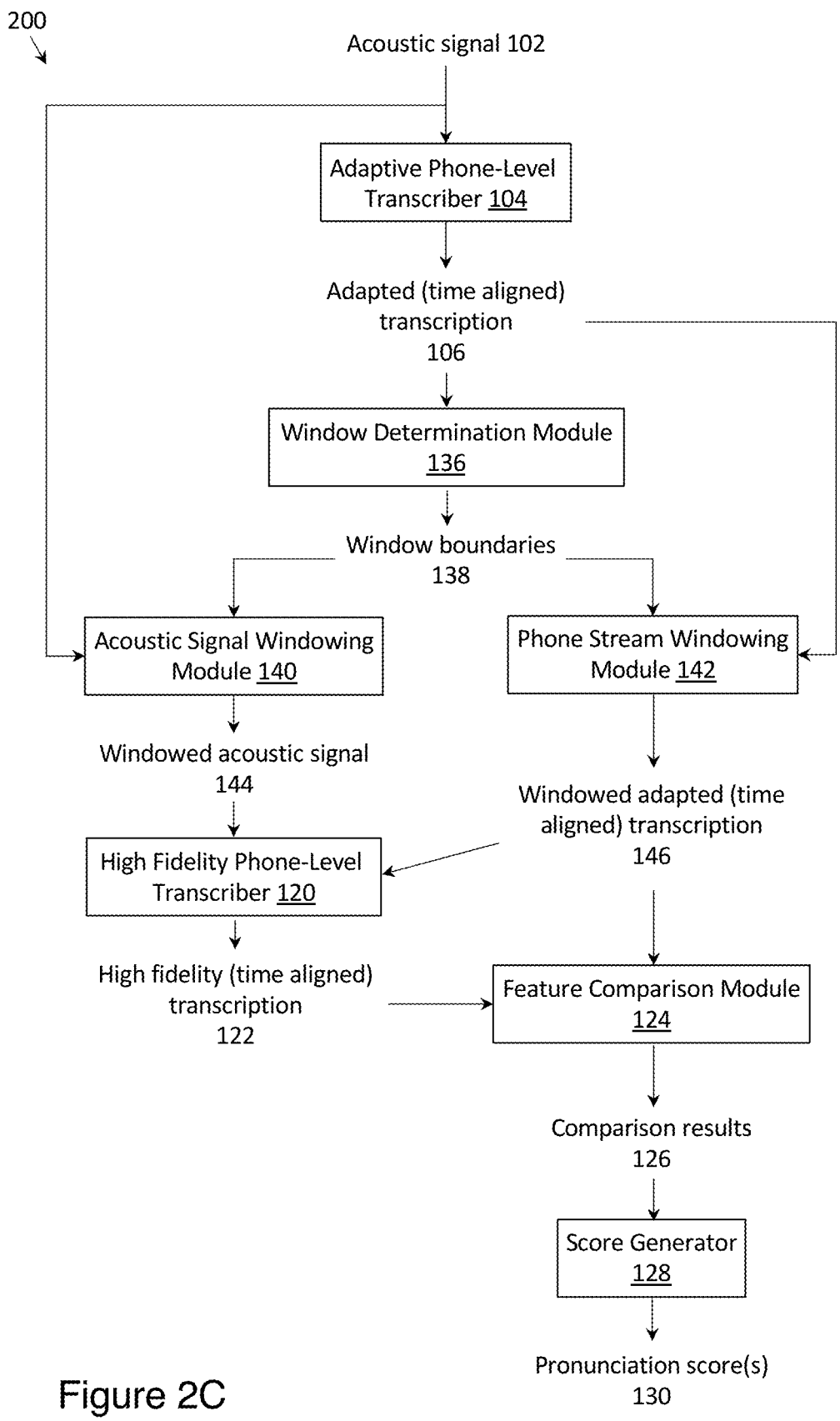
FIG. 2C depicts a speech analysis system for generating a pronunciation score from a time windowed version of the acoustic signal, in accordance with one embodiment of the invention.

The system 200 depicted in FIG. 2C employs an utterance-level analysis to compute the pronunciation score 130, as compared to systems 100 and 150 depicted in FIGS. 2A and 2B, respectively, which compute the pronunciation score 130 based on a segmented version of the acoustic signal 102. In system 200, the boundary determination module 108 is replaced with a window determination module 136, in order to remove any beginning or ending non-consonant-vowel phones. The window determination module 136 may determine the window boundaries 138 to be the first and last non-consonant-vowel phones of the adapted transcription 106. In the example of the adapted transcription 106 depicted in FIG. 9, the window boundaries would be selected as phones 1 and 37.

Figure 11:
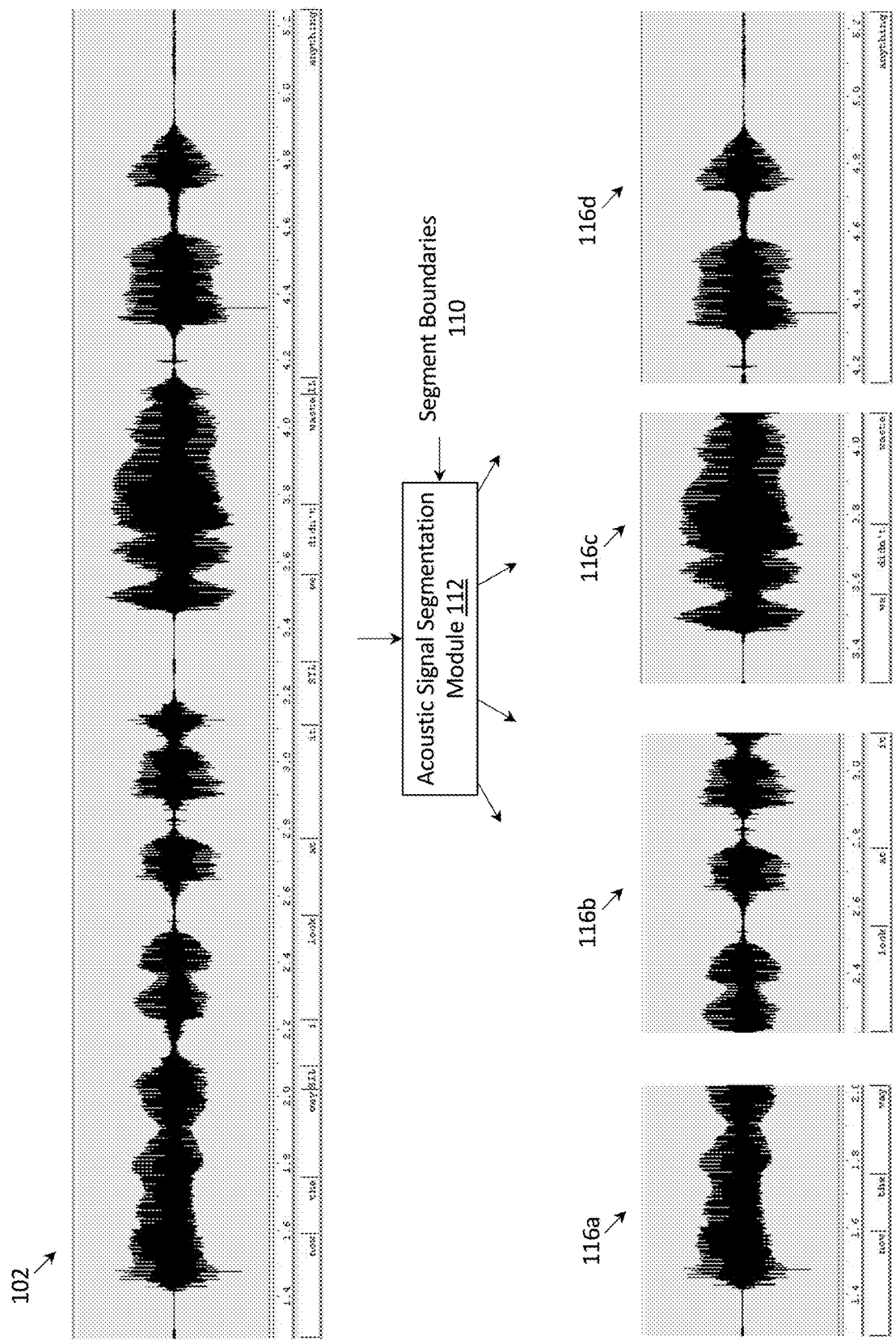
FIG. 11 depicts an example illustrating the processing performed by the acoustic signal segmentation module, in accordance with one embodiment of the invention.

In system 200, the acoustic signal segmentation module 112 is further replaced with an acoustic signal windowing module 140, which generates a time windowed version 144 of the acoustic signal 102 based on the window boundaries 138. In the example of FIG. 11 (assuming for the moment that the acoustic signal segmentation module 112 has been substituted with the acoustic signal windowing module 140), the windowed acoustic signal 144 would include frames 128-524 of the acoustic signal 102.

Figure 10:
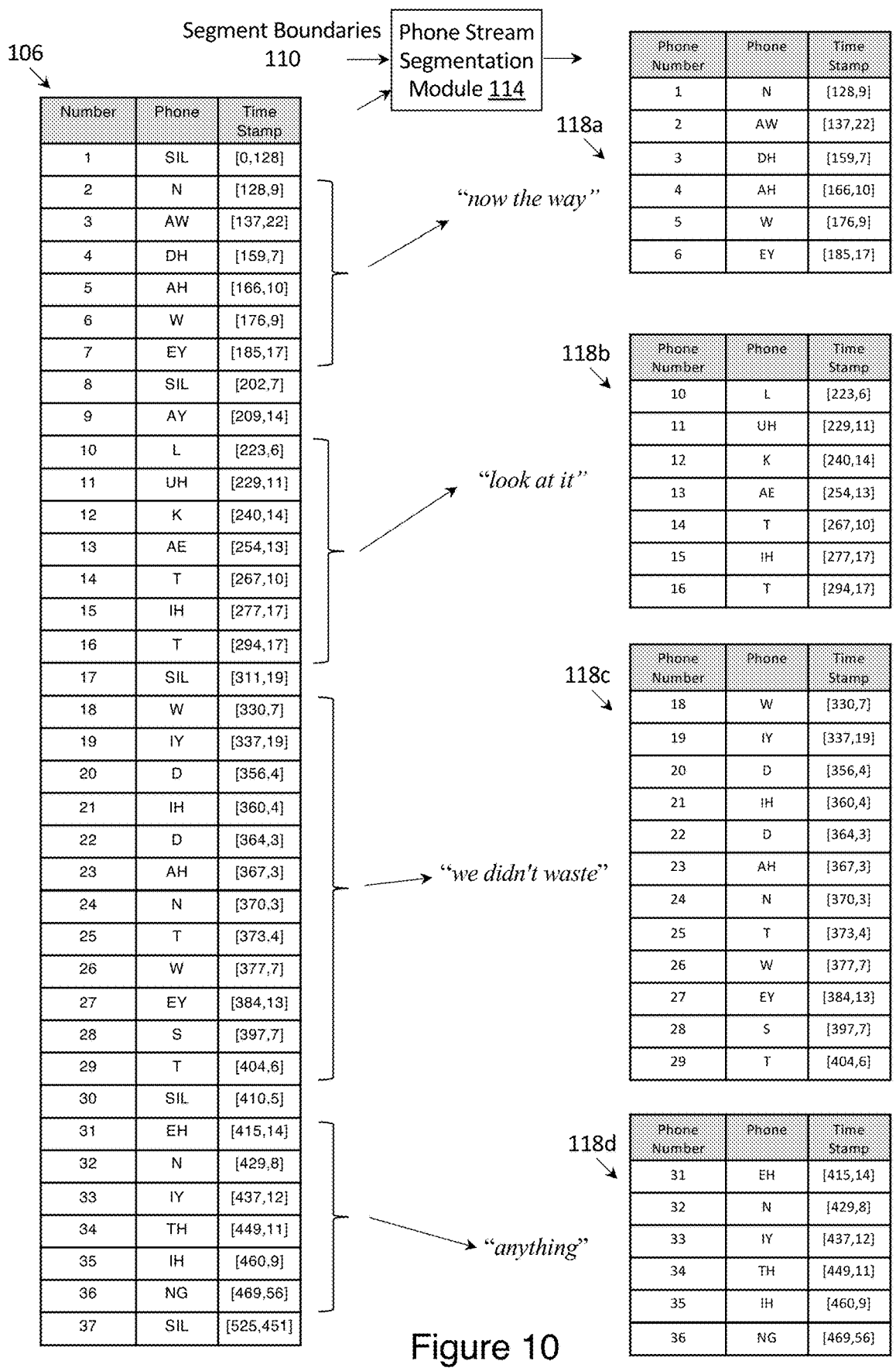
FIG. 10 depicts an example illustrating the processing performed by the phone stream segmentation module, in accordance with one embodiment of the invention.

In system 200, the phone stream segmentation module 114 is further replaced with a phone stream windowing module 142, which generates a time windowed version 146 of the adapted transcription 106. In the example of FIG. 10 (assuming for the moment that the phone stream segmentation module 114 has been substituted with the phone stream windowing module 142), the windowed adapted transcription 146 would include phones 2-36. The operation of system 200 is similar to the operation of system 100, with the exception that the pronunciation score(s) 130 are generated based on a time windowed version of the acoustic signal 102 instead of segments thereof. Therefore, it is expected that the reader will be able to generalize the examples in FIGS. 13A-13B, 14A-14B, and 16 that describe a segment-by-segment analysis of the acoustic signal 102 to an utterance-level analysis of the acoustic signal 102.

Figure 2D:
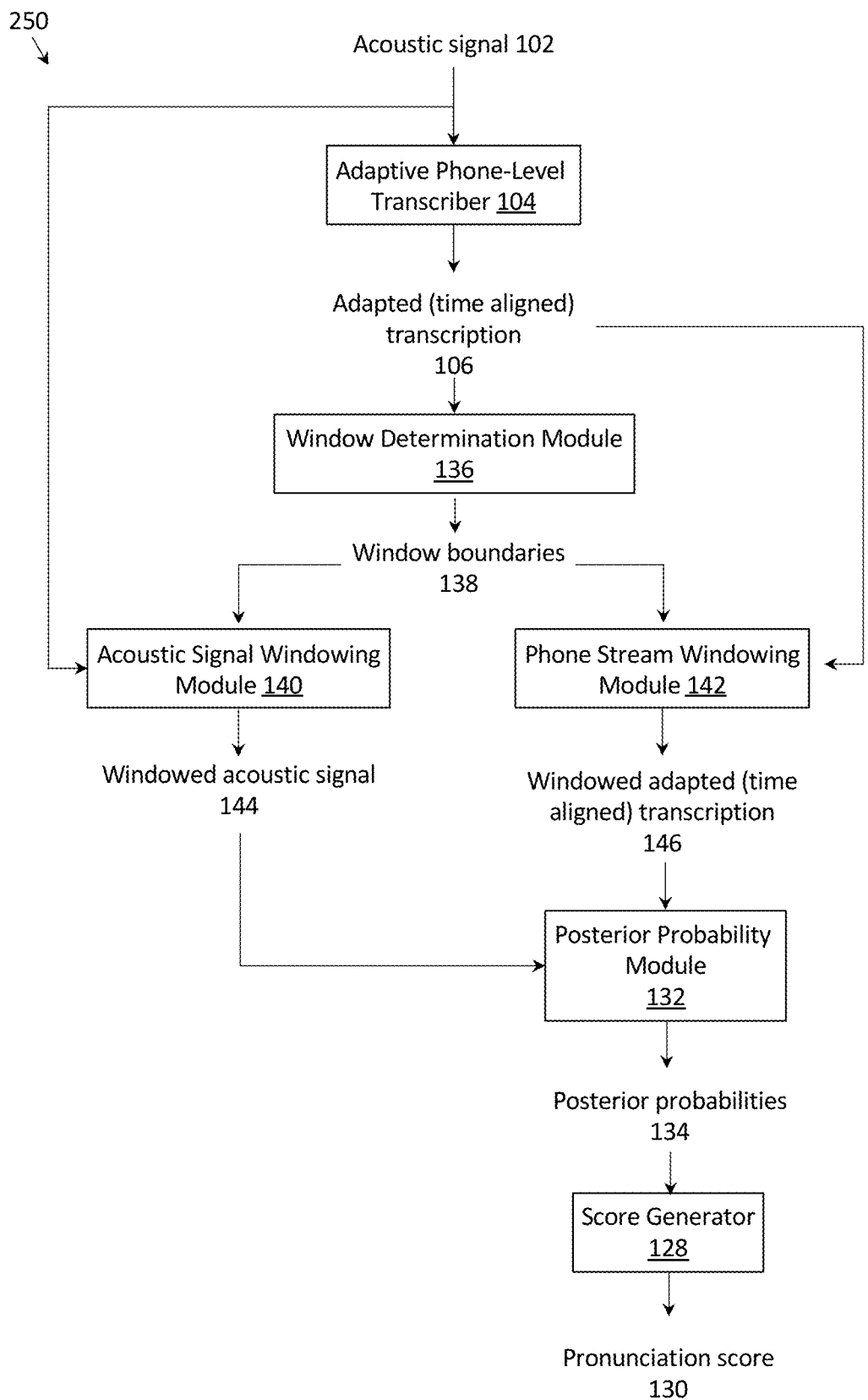
FIG. 2D depicts a speech analysis system for generating a pronunciation score from a time windowed version of the acoustic signal, in accordance with one embodiment of the invention.

Similar to the system 200 depicted FIG. 2C, an utterance-level analysis is performed by the system 250 depicted in FIG. 2D to compute the pronunciation score 130. Further, similar to the system 150 depicted in FIG. 2B, a posterior probability module 132 takes the place of the feature comparison module 124. The operation of system 250 is similar to the operation of system 150, with the exception that the pronunciation score 130 is generated based on a time windowed version of the acoustic signal 102 instead of segments thereof. Therefore, it is expected that the reader will be able to generalize the examples in FIGS. 15A-15B, and 16 that describe a segment-by-segment analysis of the acoustic signal 102 to an utterance-level analysis of the acoustic signal 102. For clarity, it is noted that while systems 100, 150, 200 and 250 have been illustrated in separate figures, it is not intended for such systems to be mutually exclusive. Indeed, one or more of systems 100, 150, 200 and 250 may be part of speech analysis system 20.

Figure 3:
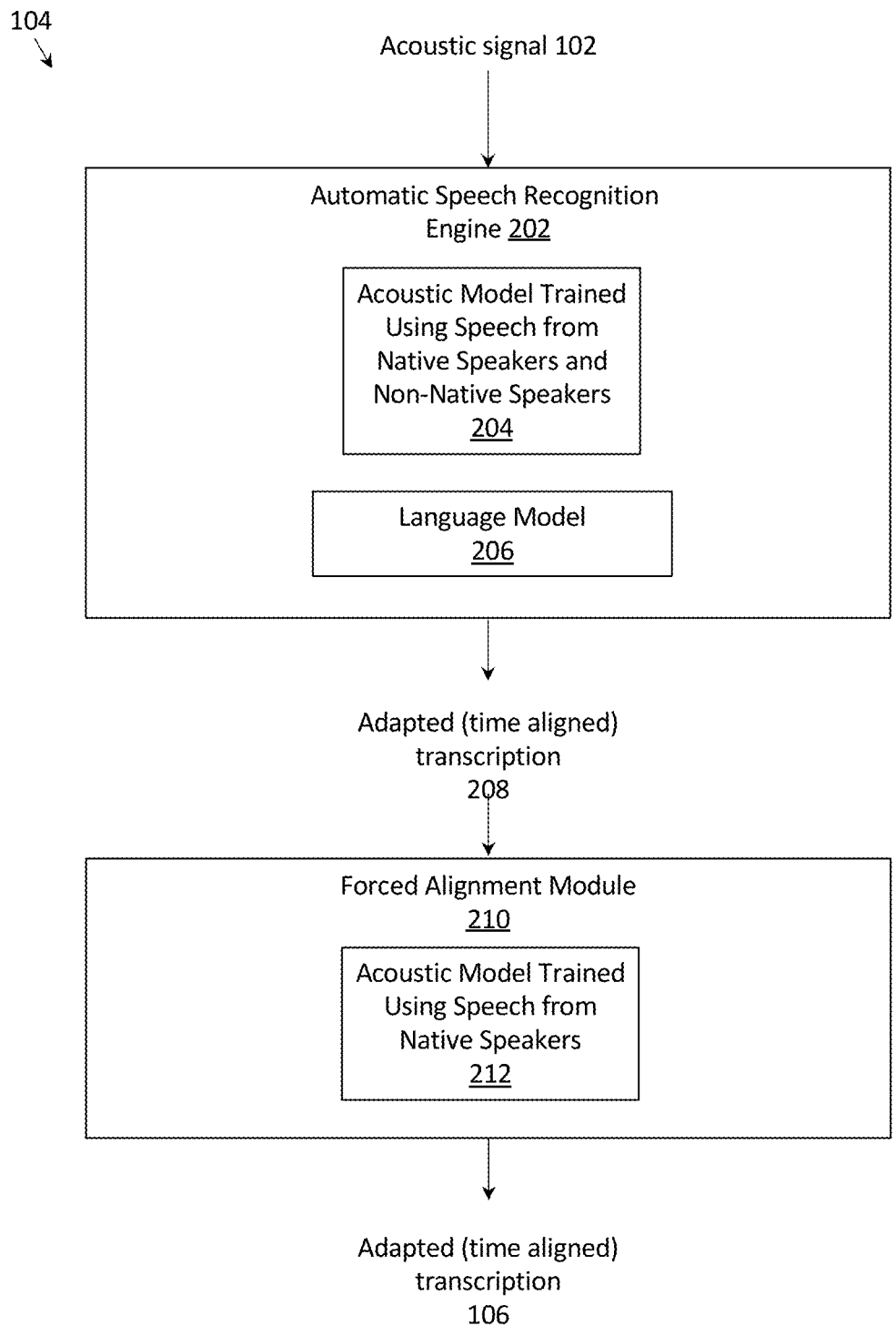
FIG. 3 depicts an adaptive phone-level transcriber for adaptively transcribing an acoustic signal, in accordance with one embodiment of the invention.

FIG. 3 depicts details of the adaptive phone-level transcriber 104. At a high level, there are two stages in the adaptive phone-level transcriber 104. First, the acoustic signal 102 is converted by an automatic speech recognition (ASR) engine 202 into an adapted (time aligned) transcription 208. Second, the time stamps of adapted transcription 208 are replaced with new time stamps by a forced alignment module 210. The use of a forced alignment module 210 is known in the art, so the details of such processing will not be provided for the sake of brevity.

ASR engine 202 includes an acoustic model 204 that is trained using speech from native speakers and non-native speakers (or speech from normative and non-normative speakers). As discussed above, such a model allows the ASR engine 202 to adapt the acoustic signal 102 into a sequence of phones that represents how native (or normative) speakers of the language would likely speak the utterance. A language model 206 is also used by the ASR engine 202 in the generation of the adapted transcription 208. As discussed above, the language model 206 may include a word level language model or a word-piece level language model. The forced alignment model 210 includes an acoustic model 212 trained using speech from native (or normative) speakers. Again, the use of a forced alignment module 210 is known in the art, so the rationale for using acoustic model 212 (as compared to another acoustic model) will not be provided for the sake of brevity.

Figure 4A:
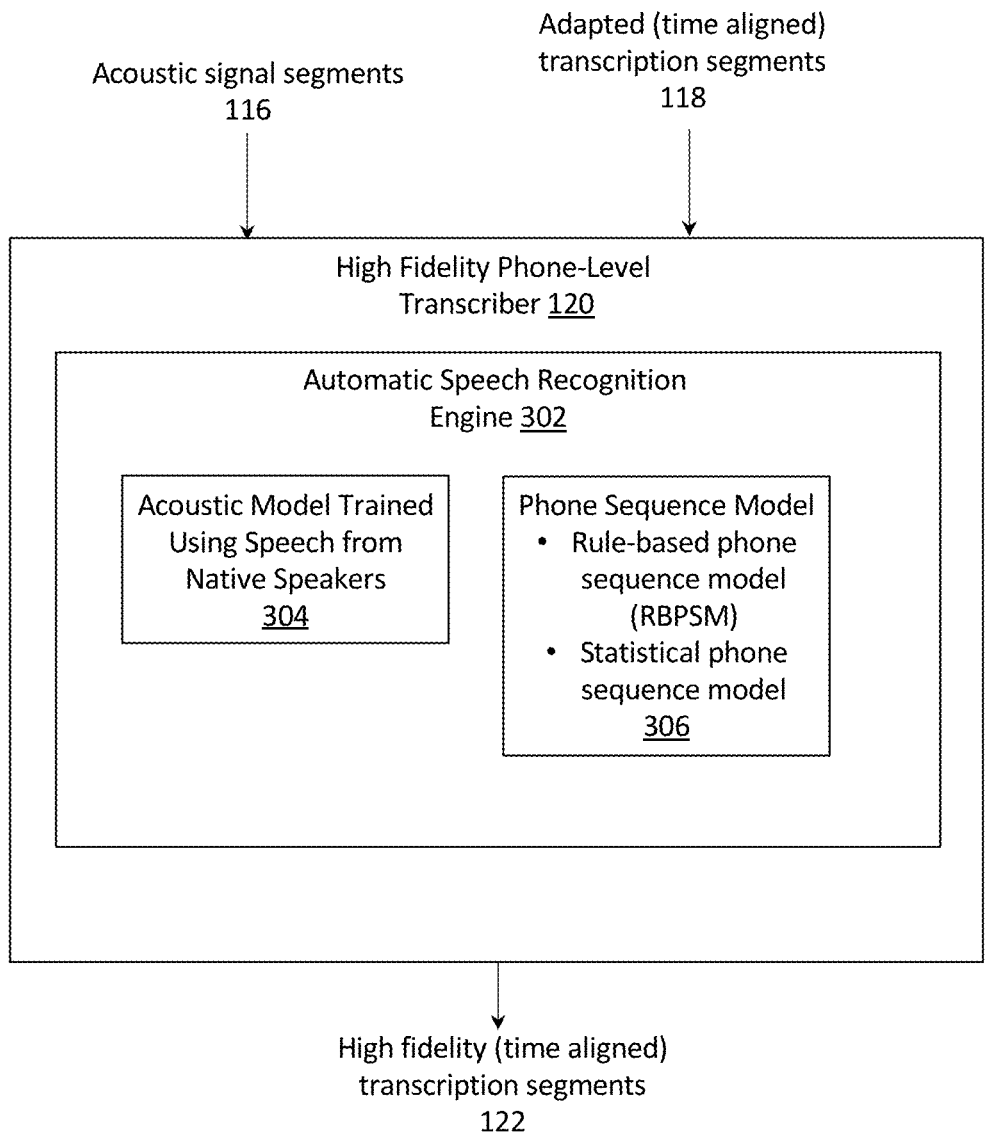
FIG. 4A depicts a high-fidelity phone-level transcriber for generating a high-fidelity transcription of an acoustic signal, in accordance with one embodiment of the invention.

FIG. 4A depicts details of the high fidelity phone-level transcriber 120, which is used to generate high fidelity transcription segments 122 from the acoustic signal segments 116. High fidelity phone-level transcriber 120 may include an ASR engine 302 that which includes an acoustic model 304 trained using speech from native (or normative) speakers. As discussed above, such a model allows the ASR engine 302 to generate a sequence of phones that represents how the native (or normative) speakers of the language would likely perceive a playback of the acoustic signal segments 116. The ASR engine 302 may also include a phone sequence model 306, which may be a statistical phone sequence model or a rule-based phone sequence model (RBPSM).

At a high level, a phone sequence model 306 estimates the probability of a given sequence of phones. A statistical phone sequence model estimates such joint probability based on the marginal and conditional probabilities. As a simple example, if $X_1$, $X_2$ and $X_3$ are random variables that record the phones at three consecutive positions 1, 2 and 3 within a word, the probability of a sequence of three phones $s_1$, $s_2$ and $s_3$ may be decomposed in terms of the marginal and conditional probabilities as follows:

$$P(X_1=s_1, X_2=s_2, X_3=s_3) = P(X_1=s_1)P(X_2=s_2|X_1=s_1)P(X_3=s_3|X_1=s_1, X_2=s_2)$$

The marginal and conditional probabilities may be statistically estimated based on the frequency of past phone strings in the adapted transcription 106, aggregated across all speakers 12.

A RBPSM differs from a statistical phone sequence model in that it assumes the phone stream from the adapted transcription segment 118 as the ground truth and attempts to model the probability of deviations from this ground truth using a Markov chain. The states of the Markov chain comprise of an initial state, final state, and intermediate states that represent phones. The same phone may be represented in multiple distinct intermediate states. By design, the traversal with the highest probability through the Markov chain will correspond to the ground truth (i.e., the phone stream from the adapted transcription segment 118). Deviations from the ground truth may result from substituted phones, skipped phones, etc., and traversals which deviate from the ground truth will be assigned lower probabilities.

Figure 4B:
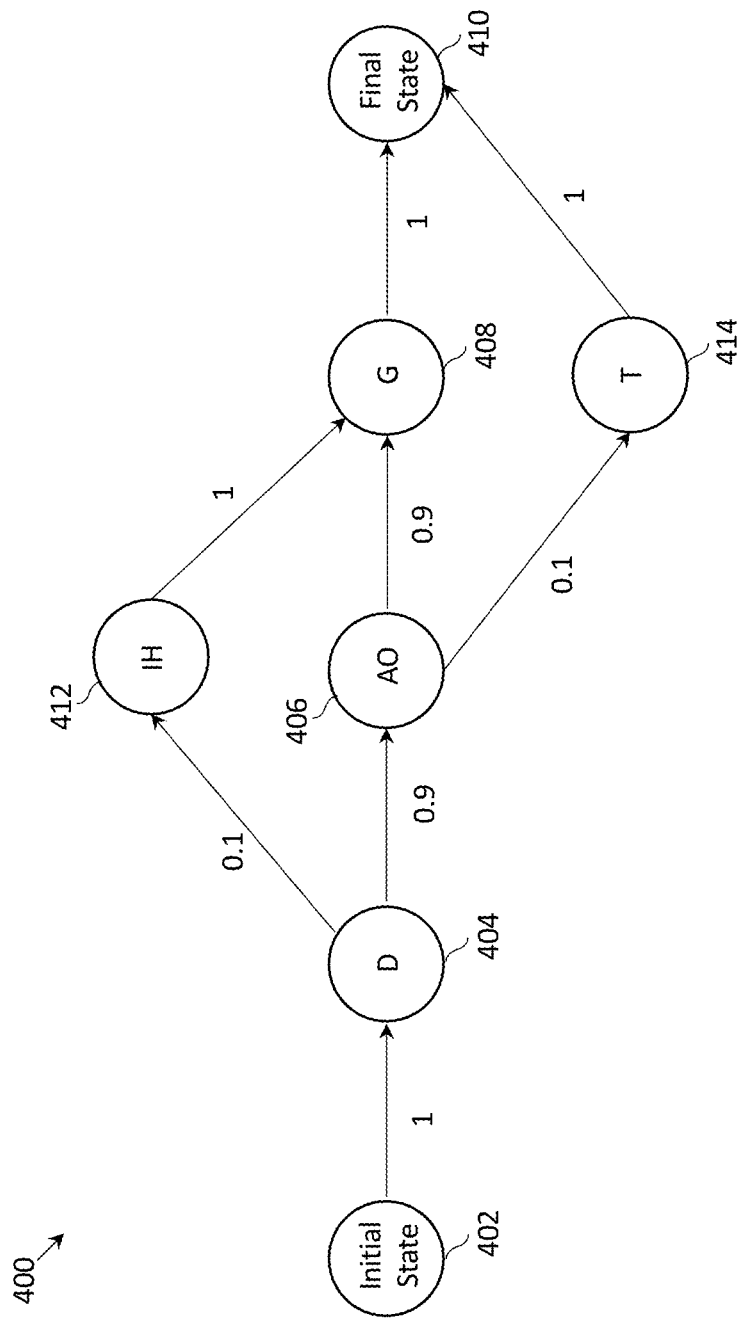
FIG. 4B depicts an example to illustrate a rule based phone sequence model (RBPSM), in accordance with one embodiment of the invention.

FIG. 4B provides an example of a RBPSM. Assume that the adapted transcription segment 118 consists of the phone sequence [D AO G], corresponding to the word "dog." The Markov chain 400 depicted in FIG. 4B may represent a simplified RBPSM that models deviations from the ground truth of [D AO G]. The Markov chain 400 includes a total of seven states, including the initial state 402, the final state 410, and the intermediate states 404, 406, 408, 412 and 414, corresponding to the phones D, AO, G, IH and T, respectively. The transition probability from the initial state 402 to state D 404 is 1.0. The transition probability from state D 404 to state AO 406 is 0.9, and from state D 404 to state IH 412 is 0.1. The transition probability from state AO 406 to state G 408 is 0.9, and from state AO 406 to state T 414 is 0.1. Finally, the transition probability from either State G 408 or State T 414 to the final state 410 is 1.0.

The traversal from Initial State→D→AO→G→Final State represents the traversal of the ground truth and has the highest probability of 1*0.9*0.9*1 or 0.81. The traversal from Initial State→D→IH→G→Final State represents a phone sequence with the middle phone substituted with the phone IH as compared to the ground truth. Such deviated traversal (corresponding to the word "dig") has a probability of 1*0.1*1*1 or 0.1, which is lower than the probability of the ground truth. Lastly, the traversal from Initial State→D→AO→T→Final State represents a phone sequence with the last phone substituted with the phone T as compared to the ground truth. Such deviated traversal (corresponding to the word "dot") has a probability of 1*0.9*0.1*1=0.09, which again is lower than the probability of the ground truth.

Previously, it was noted that the high fidelity transcription segment 122 is as true to the speaker's utterance as possible, so the use of the adapted transcription segment 118 as the ground truth for the RBPSM 306 may seem to conflict with this goal. In actuality, the hypothesis from the acoustic model 304 is given much more weight than the hypothesis from the phone sequence model 306. For instance, if the acoustic model 304 returns the phone stream of [D IH G] with probability 0.9 while the phone sequence model 306 returns the phone stream of [D AO G] with probability 0.9, the ASR engine 302 will use the output of the acoustic model 304 and [D IH G] will be returned as the high fidelity transcription segment. It is only in some corner cases, such as when the acoustic model 304 outputs two hypotheses that are equally likely, that the output of the phone sequence model 306 has an influence on the output of the ASR engine 302. In the instance that two hypotheses from the acoustic model 304 are equally likely, the output from the phone sequence model 306 could be used as a tie breaker to select one of the two equally likely hypotheses.

FIG. 5 depicts details of the posterior probability module 132, which is used to generate a posterior probability 134 of each phone of the adapted transcription segment 118 (i.e., the probability of each phone of the adapted transcription segment 118 conditioned on observations of the corresponding acoustic signal segment 116, an acoustic model 304 trained with speech from the native (or normative) speakers of the language, a phone sequence model 306 and the frame of the phone). The posterior probability module 132 and the high fidelity phone-level transcriber 120 may share the same ASR engine 302. That is, the ASR engine 302 may be used to generate high fidelity transcription segments 122 (as is the case in FIG. 4) and posterior probabilities 134 (as is the case in FIG. 5). The computation of the posterior probability 134 may involve using a forward-backward algorithm over the lattice produced by the phone sequence model 306, such as the RBPSM.

In the remaining figures, examples are provided to illustrate the above-described algorithms. Before presenting the examples, a brief discussion of phones is provided. As is known in the art, a phone is a speech segment with distinct physical or perceptual properties and serves as the smallest unit of phonetic speech analysis. In the discussion below, phones are classified into three categories: consonants, vowels and non-consonant-vowels. Consonant phones are typically pronounced with a closed or partially closed vocal tract. Vowels phones are typically pronounced with an open vocal tract. Non-consonant-vowel phones may include all sounds that are not consonant phones or vowel phones, such as pauses in a speaker's speech, which may include mouth sounds (e.g., swallowing sound, clearing of one's throat, etc.), coughing, sneezing, laughing, etc. The examples below will utilize the 39 phones from the Carnegie Mellon University (CMU) pronouncing dictionary, also known as CMUdict, which is an open-source pronouncing dictionary created by the speech group at CMU for use in speech recognition research. CMUdict is a mapping between 39 common acoustic sounds in American English and 39 phones. The 39 phones include 14 vowel phones and 25 consonant phones, and are listed in the first column of table 600 in FIG. 6A, The last row of table 600 includes the non-consonant-vowel phone Sit Words illustrating the 39 phones are provided in column 3 of table 600 and the deconstruction of each of the words into their phone constituents are provided in column 4. It is noted that the example words in table 600 are copied from the webpage of the CMUdict.

As defined in CMUdict, phones may be associated with certain phonetic properties. For example, vowel phones may be associated with the stress indicators provided in table 602 of FIG. 6B, indicating the relative degree of stress a vowel phone has in a word. As defined in CMUdict, the labels "0," "1," and "2" indicate no stress, primary stress and secondary stress, respectively. All phones (whether vowel, consonant, or non-vowel-consonant) may be associated with one of the phone positions provided in table 604 of FIG. 6B, indicating the position of a phone in a word. As defined in CMUdict, the label "_B" indicates that the phone position is the first phone in a word. The label "_I" indicates that the phone position is one of the phones that is sandwiched between the first and last phones in a word. The label "_E" indicates that the phone position is the last phone in a word. Lastly, the label "_S" indicates that the phone is a standalone phone.

Figure 7:
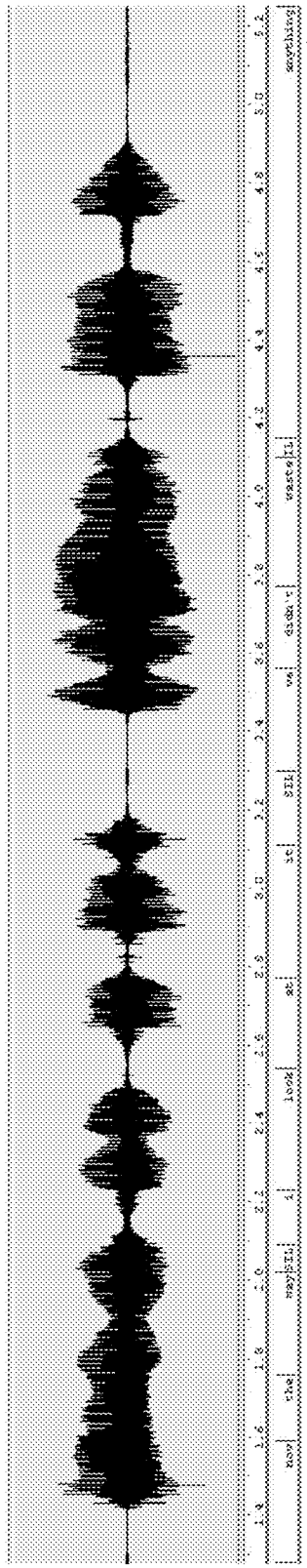
FIG. 7 depicts an example illustrating the processing performed by the automatic speech recognition (ASR) engine of the adaptive phone-level transcriber, in accordance with one embodiment of the invention.

FIG. 7 depicts an example of ASR engine 202 transcribing an acoustic speech signal 102 into an adapted transcription 208. The acoustic speech signal 102 comprises a sequence of voltages, and is graphically illustrated as a time plot of voltage over time (i.e., the y-axis is voltage, and the x-axis is time with units of milli-seconds). The acoustic speech signal 102 corresponds to an utterance of speaker 12, the utterance corresponding to the words "now the way I look at it we didn't waste anything." To clarify, in the present example, the speaker 12 is a non-native speaker of American English, so the way in which the speaker 12 speaks the words "now the way I look at it we didn't waste anything" does not resemble the way in which a native speaker would speak those same words. Underneath the time axis of the acoustic signal 102, the words "now the way I look at it we didn't waste anything" are shown for clarity, but such words are only shown for discussion purposes and are not actually provided to the ASR engine 202.

The output of the ASR engine 202 is an adapted transcription 208, which includes a sequence of phones representing how a native speaker of American English would likely speak the words "now the way I look at it we didn't waste anything." The adapted transcription 208 begins with the non-consonant-vowel phone "SIL_S," followed by the two phones "N_B AW1_E," which are the constituents of the word "now," and so on. In the two phones "N_B AW1_E," the "_B" label indicates that the phone "N" is the first phone in the word "now" and the "_E" label indicates that the phone "AW" is the last phone in the word "now." Further in "N_B AW1_E," the "1" label indicates that the vowel phone "AW" received the primary stress in the word "now." For simplicity, the instant example assumes that the ASR engine 202 is able to infer the intended phones of speaker 12 with 100% accuracy, but this is not true in general. If the speaker 12 has very poor pronunciation, there may be errors in the adapted transcription (and thus errors in the baseline). It is noted that the words annotating the adapted transcription 208 are only provided for clarity and are not actually part of the adapted transcription 208.

Figure 8:
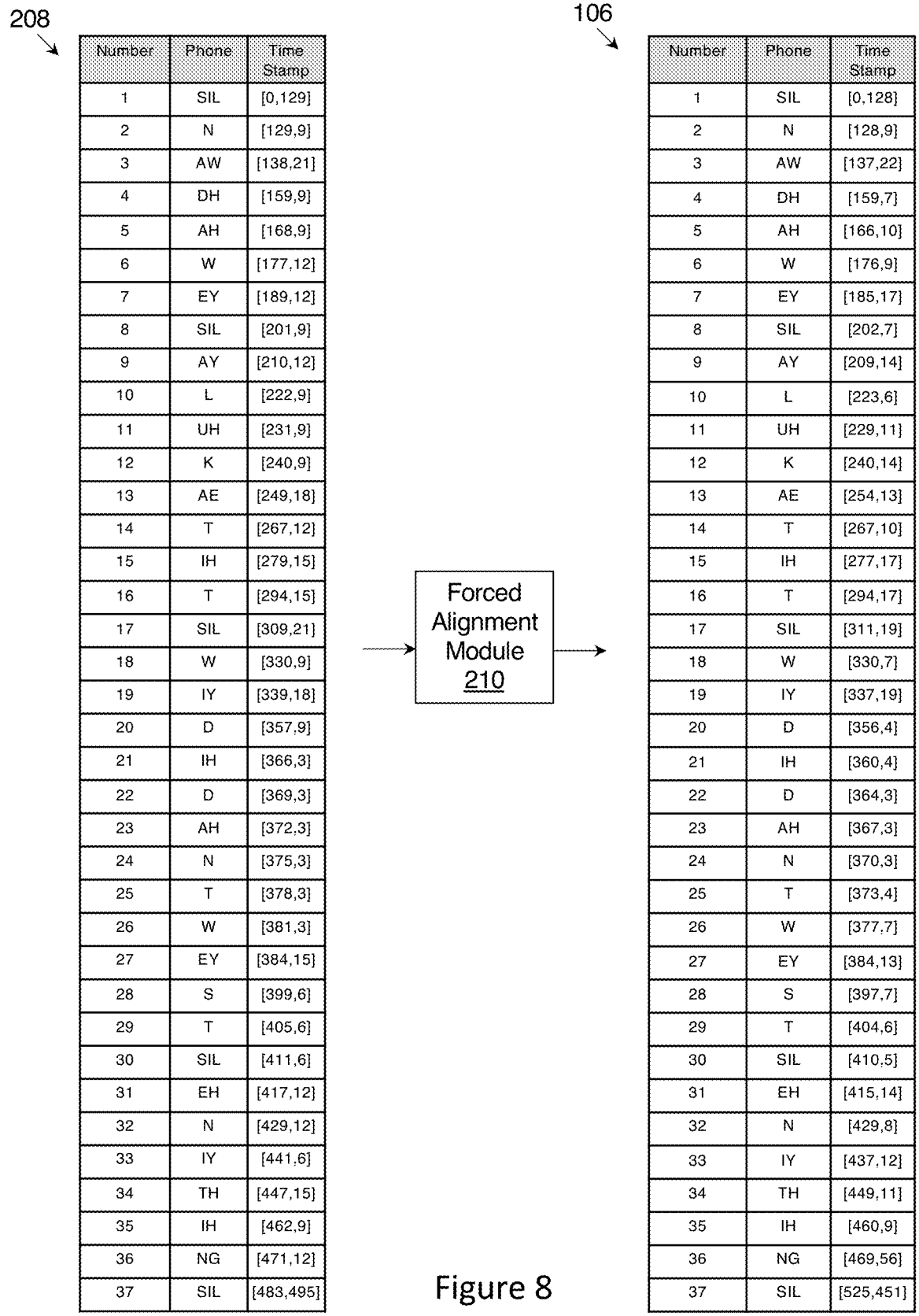
FIG. 8 depicts an example illustrating the processing performed by the forced alignment module of the adaptive phone-level transcriber, in accordance with one embodiment of the invention.

FIG. 8 depicts an example of the forced alignment module 210 substituting old time stamps with new time stamps. The table on the left contains the old time stamps as generated by the ASR engine 202, and the table on the right contains the new time stamps as generated by the forced alignment module 210. For example, for phone 1 SIL, the time stamp [0, 129] has been substituted with the time stamp [0, 128] by the forced alignment module 210. The phones themselves are not altered by the force alignment module 210, only their time stamps. For simplicity, the phonetic properties have been omitted from these and the following tables.

Figure 9:
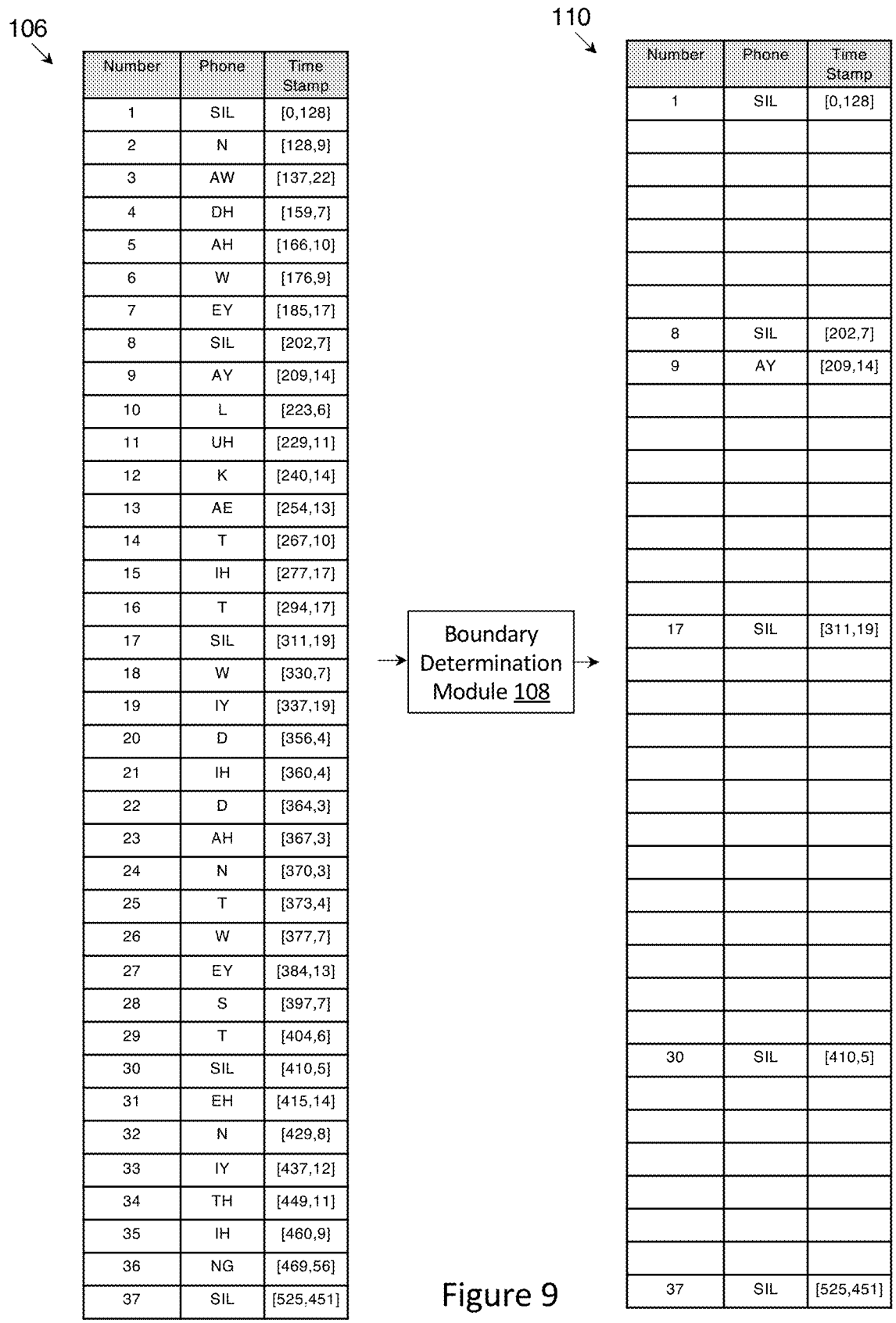
FIG. 9 depicts an example illustrating the processing performed by the boundary identification module, in accordance with one embodiment of the invention.

FIG. 9 depicts an example of the boundary determination module 108 identifying segment boundaries 110 within the adapted (time aligned) transcription 106. As previously described, a phone stream can be segmented at the phone, word or phrase levels. In the instant example, the adapted transcription 106 is segmented at the phrase level. Through experimentation, it was determined that the single word phones and non-consonant-vowel phones are a good choice for phrase boundaries. Example of single word phones include "a," "an," "am," "are," "eye," "or," "oh," "owe," and "I." Based on such choice for phrase boundaries, the boundary determination module 108 determines phones 1, 8, 17, 30 and 37 corresponding to the non-consonant-vowel phone SIL and phone 9 corresponding to the single word phone AY as the segment boundaries.

FIG. 10 depicts an example of the phone stream segmentation module 114 segmenting the adapted transcription 106 into a plurality of adapted transcription segments 118a-118d. Based on the segment boundaries 110, phone stream segmentation module 114 segments phones 2-7 (corresponding to the words "now the way") into the adapted transcription segment 118a, segments phones 10-16 (corresponding to the words "look at it") into the adapted transcription segment 118b, segments phones 18-29 (corresponding to the words "we didn't waste") into the adapted transcription segment 118c, and segments phones 31-36 (corresponding to the word "anything") into the adapted transcription segment 118d. For clarity, it is noted that phone 9 "AY" (corresponding to the word "I") is treated as a segment boundary, and consequently is excluded from the adapted transcription segment 118b (i.e., 118b includes the phone stream corresponding to "look at it" instead of "I look at it").

While the present example employs phrase-level segmentation, phone and word level segmentation can also be explained in the context of FIGS. 7 and 9. If phone level segmentation were performed, the time stamps associated with each phone, as shown in FIG. 9, could be used to determine the phone level boundaries. For example, the first phone "SIL" could be segmented as frames 0-127, the second phone "N" could be segmented as frames 128-136, and so on. If word level segmentation were performed, the phone positions associated with each phone, as shown in FIG. 7, could be used to determine the word level boundaries. More specifically, the "_B" phone position would indicate the start of a word and the "_E" phone position would indicate the end of a word. Based on such phone positions, the first word could be segmented as frames 128-158 (corresponding to the word "now"), the second word could be segmented as frames 159-175 (corresponding to the word "the"), and so on.

FIG. 11 depicts an example of the acoustic signal segmentation module 112 segmenting the acoustic signal 102 into a plurality of acoustic signal segments 116a-116d. Based on the segment boundaries formed by phones 1 and 8, the acoustic signal segmentation module 112 segments the acoustic signal corresponding to frames 128-201 into acoustic signal segment 116a, which corresponds to the words "now the way." Based on the segment boundaries formed by phones 9 and 17, the acoustic signal segmentation module 112 segments the acoustic signal corresponding to frames 223-310 into acoustic signal segment 116b, which corresponds to the words "look at it." Based on the segment boundaries formed by phones 17 and 30, the acoustic signal segmentation module 112 segments the acoustic signal corresponding to frames 330-409 into acoustic signal segment 116c, which corresponds to the words "we didn't waste." Finally, based on the segment boundaries formed by phones 30 and 37, the acoustic signal segmentation module 112 segments the acoustic signal corresponding to frames 415-524 into acoustic signal segment 116d, which corresponds to the word "anything."

Figure 12:
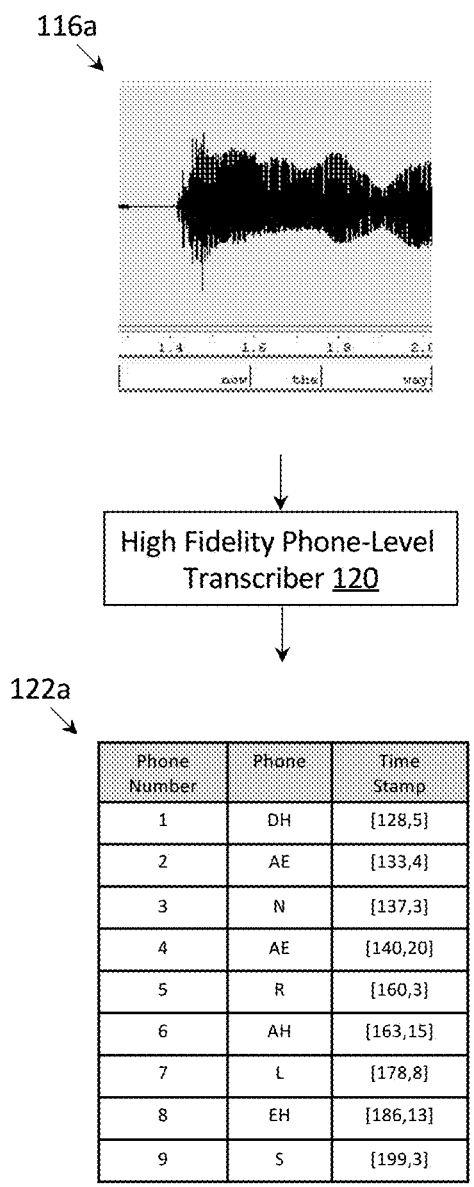
FIG. 12 depicts an example illustrating the processing performed by the high fidelity phone-level transcriber, in accordance with one embodiment of the invention.

FIG. 12 depicts an example of the high fidelity phone-level transcriber 120 transcribing acoustic signal segment 116a into adapted transcription segment 122a. For simplicity, only acoustic signal segment 116a is depicted as the input to high fidelity phone-level transcriber 120, but it is understood that the other acoustic signal segments 116b-116d would also be provided as input to the high fidelity phone-level transcriber 120. The high fidelity phone-level transcriber 120 outputs a high fidelity (time aligned) transcription segment 122a in response to the acoustic signal segment 116a. For clarity, it is noted that this sequence of phones represents how the native speakers of American English would likely perceive a playback of the acoustic signal segment 116a. A visual comparison reveals that the high fidelity transcription segment 122a differs significantly from the adapted transcription segment 118a (i.e., the baseline), reflecting the poor pronunciation of the speaker 12.

FIGS. 13A-13B depict an example of a phone matching analysis that may be performed by the feature comparison module 124. For simplicity, the example illustrates the feature comparison for only the first segment (corresponding to the words "now the way"), but it is understood that such feature comparison would be performed for the remaining segments in a similar fashion. At a high level, the phone matching analysis seeks to answer the question of whether two phones match at the same time between the high fidelity transcription segment 122a and the adapted transcription segment 118a, and such analysis is carried out in a phone-by-phone basis. Such an analysis is complicated by the fact that typically the phone boundaries are not aligned between the high fidelity transcription segment 122a and the adapted transcription segment 118a. Therefore, a frame level analysis is needed to accomplish the task of phone matching. The phone matching analysis proceeds as follows: The frames of the first phone "N" in the adapted phone segment 118a are identified: 128-136. The feature comparison module 124 determines whether the high fidelity phone segment 122a contains any matching phones within these same frames 128-136 (i.e., a single matching phone within these frames is sufficient to qualify as a phone match). In the present case, the high fidelity phone segment 122a does not contain any "N" phones during frames 128-136, so the feature comparison module 124 determines the comparison result 126 of "no match" for the first phone in the adapted phone segment 118a. A similar analysis is performed for the remaining phones. As shown in FIGS. 13A-13B, only 1 matching phone (i.e., AH) was present in the first segment corresponding to the phrase "now the way." It is noted that phonetic properties may also be considered in the determination of phone matches. For example, the matching criteria may also require the phone stresses and/or phone positions to match in order for two phones to be considered to be a match.

FIGS. 14A-14B depict an example of another phone matching analysis that may be performed by the feature comparison module 124. Again, for simplicity, the example illustrates the feature comparison for only the first segment (corresponding to the words "now the way"), but it is understood that such feature comparison would be performed for the remaining segments in a similar fashion. The phone matching analysis in FIGS. 14A-14B differs from the phone matching analysis in FIGS. 13A-13B in that it seeks to answer the question of whether two frames have a matching phone, and such analysis is carried out in a frame-by-frame fashion. The phone matching analysis proceeds as follows: The adapted phone and the high fidelity phone from frame 128 are compared. In the present case, the adapted phone "N" does not match the high fidelity phone "DH" so the feature comparison module 124 determines the comparison result 126 of no match for frame 128. A similar analysis is performed for the remaining frames. As shown in FIGS. 14A-14B, there are a total of 10 matching frames for the first segment corresponding to the phrase "now the way."

FIGS. 15A-15B depict an example of posterior probabilities 134 that may be computed by posterior probability module 132 for the adapted phones 118a. Again, for simplicity, the example illustrates the posterior probabilities 134 for only the first segment (corresponding to the words "now the way"), but it is understood that such posterior probabilities 134 would be computed for the remaining segments in a similar fashion. As previously described, the posterior probability of a phone is defined as the conditional probability of the phone given observations of the acoustic signal segment, an acoustic model trained with speech from the native (or normative) speakers of the language, a phone sequence model and the frame of the phone. The values in FIGS. 15A-15B indicate that the system is not very confident that it has correctly identified the adapted phones in frames 128-165 and 175-201, while it is very confident that it has correctly identified the adapted phones in frames 166-174. The last column in the table records the log of the posterior probabilities 134. The value of −8 is a floor value, so any log posterior probability value that is less than −8 is simply assigned the value of −8.

FIG. 16 depicts an example of how the score generator 128 generates pronunciation scores 130 from comparison results 126 and/or posterior probabilities 134 (which may generally be referred to as statistics of the acoustic signal segments 116). The first five columns of table 160 tabulate intermediate values, and the last three columns of table 160 tabulate pronunciation scores.

The intermediate values may include the total number of phones for each of the phrases (column 1, rows 1-4), and across all four phrases (column 1, row 5). The intermediate values may include the total number of frames for each of the phrases (column 2, rows 1-4), and across all four phrases (column 2, row 5). The intermediate values may include the total number of matching phones for each of the phrases (column 3, rows 1-4), and across all four phrases (column 3, row 5). The total number of matching phones for the phrase "now the way" (i.e., which was 1) was discussed in FIGS. 13A-13B. The intermediate values may include the total number of frames with matching phones for each of the phrases (column 4, rows 1-4), and across all four phrases (column 4, row 5). The total number of frames with matching phones for the phrase "now the way" (i.e., which was 10) was discussed in FIGS. 14-14B. The intermediate values may include the total log posterior probability for each of the phrases (column 5, rows 1-4), and across all four phrases (column 5, row 5). For the phrase "now the way," the total log posterior probability of −512 corresponds to summing the right most column of FIGS. 15A-15B.

Table 160 tabulates three pronunciation scores which are calculated based on the intermediate values in table 160. The first pronunciation score is referred to using the acronym PPM which stands for "percent phone match." The PPM can be calculated for individual phrases in which it is computed as the number of matching phones for a phrase divided by the number of phones in that phrase (e.g., in the phrase "now the way", PPM=⅙=0.17), or can be calculated across all phrases in an utterance as the number of matching phones across all phrases divided by the total the number of phones across all phrases (e.g., PPM=7/31=0.23).

For clarity, it is noted that the total number of phones across all phrases in an utterance, in general, may not be equal to the total number of phones in the utterance, since the convention taken for phrases excludes non-consonant-vowel phones as well as single word phones. For the acoustic signal 102 example from FIG. 7, the total number of phones across all four phrases is 31, whereas the total number of phones (including non-consonant-vowel phones and single word phones) is 37.

The second pronunciation score is referred to using the acronym PFM which stands for "percent frame match." The PFM can be calculated for individual phrases in which it is computed as the number of frames with matching phones for a phrase divided by the number of frames in that phrase (e.g., in the phrase "now the way", PPM=$^{10}$/74=0.14), or can be calculated across all phrases in an utterance as the number of frames with matching phones across all phrases divided by the total the number of frames across all phrases (e.g., PPM=$^{60}$/352=0.17).

The third pronunciation score is referred to using the acronym LPP which stands for the frame-normalized log posterior probability for consonant and vowel phones. The LPP can be calculated for individual phrases in which it is computed as the total log posterior probability for a phrase divided by the number of frame in that phrase (e.g., in the phrase "now the way", LPP=$-^{512}$/74=−6.9), or can be calculated across all phrases in an utterance as the total log posterior probability across all phrases divided by the total the number of frames across all phrases (e.g., PPM=$-^{2320}$/352=−6.6).

Importantly, such machine-generated pronunciation scores have been shown to be highly correlated with human-generated pronunciation scores, so it is possible that such machine-generated pronunciation scores could be used in place of human-generated pronunciation scores. As human scoring is an expensive and time consuming process, such machine-generated pronunciation scores would be of great value to the field of educational measurement.

Figure 18A:
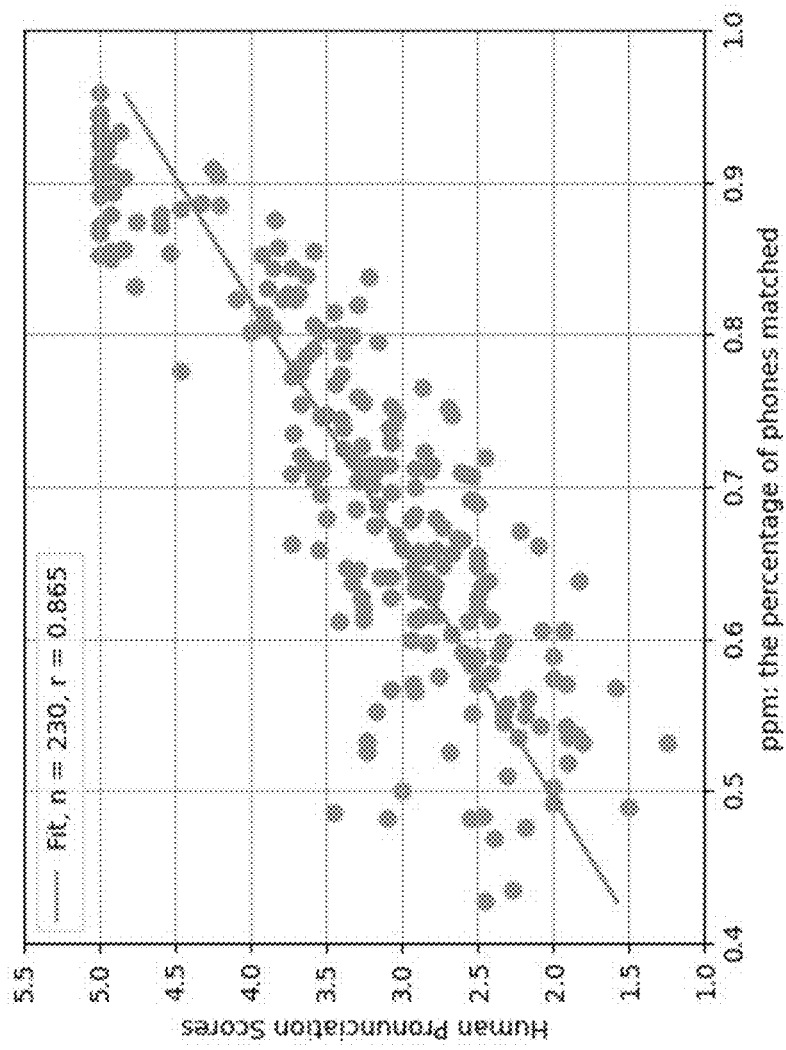
FIGS. 18A-18C depict scatter plots in which the x-value of each data point represents the machine-generated score of utterances from a speaker, and the y-value represents a human-generated score for a random sampling of the same utterances from the speaker, in accordance with one embodiment of the invention.
Figure 18B:
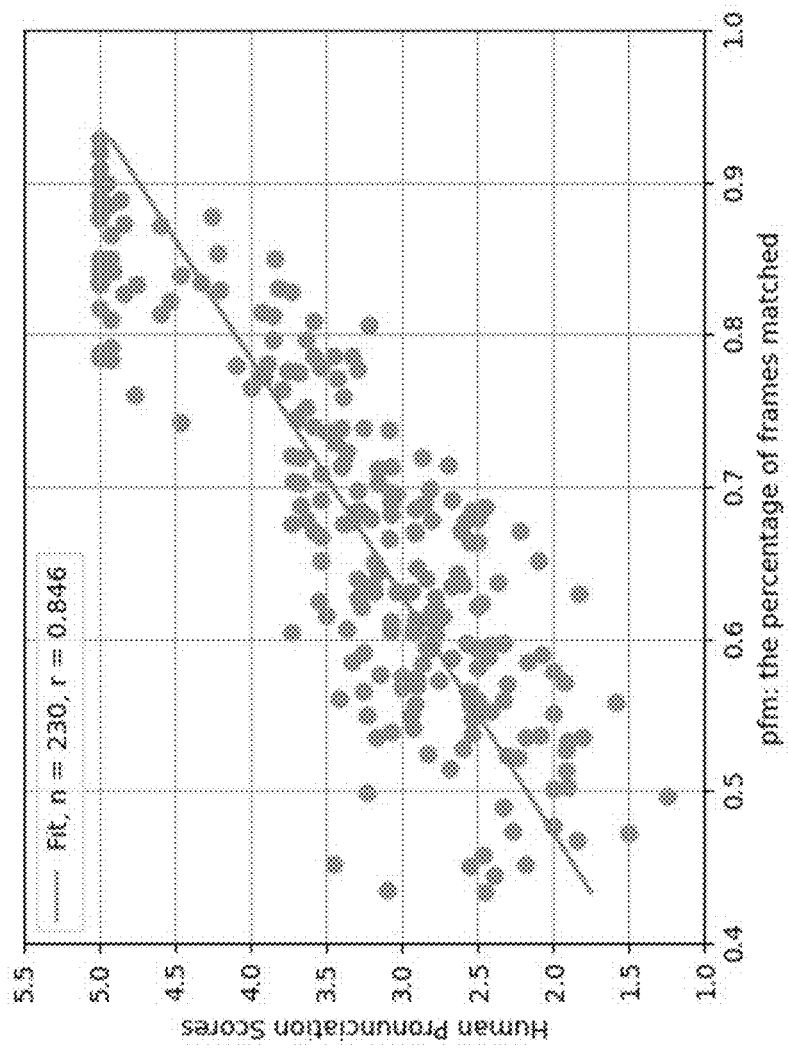
Figure 18C:
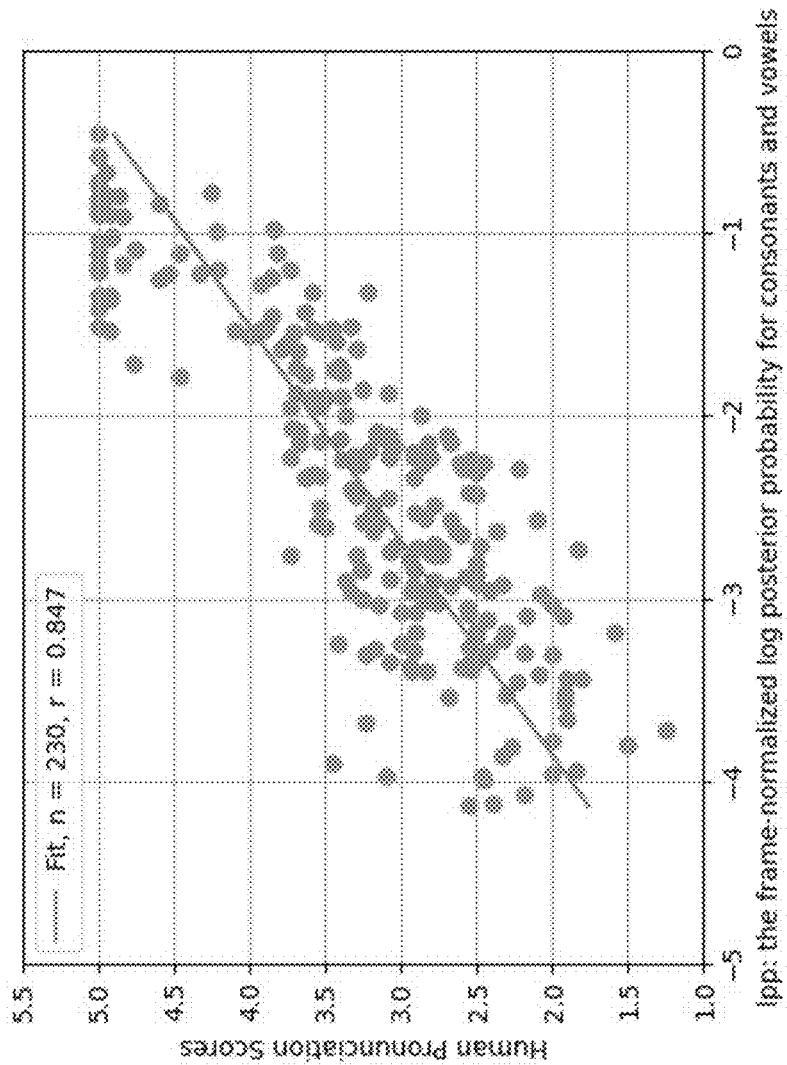

Validation results for each of the three pronunciation scoring methods (i.e., PPM, PFM and LPP), are shown in FIGS. 18A-18C. Random samples from the utterances from 230 participants were scored by human raters in accordance with the pronunciation rubric depicted in FIG. 17, on a scale from 0 to 5, in which a score of 0 corresponds to an observation "insufficient or irrelevant sample for rating," a score of 1 corresponds to an observation of "Pervasive segmental and/or lexical stress errors, or fully characteristic of another language; thus, largely unintelligible," a score of 2 corresponds to an observation of "Many segmental errors and a few errors in lexical stress, but most words intelligible in context," a score of 3 corresponds to an observation of "Has some obvious segmental errors that render a few words difficult to understand," a score of 4 corresponds to an observation of "Easily intelligible, with correct phonological forms, but some clearly non-native segmental patterns," and a score of 5 corresponds to an observation of "Very native-like and completely intelligible. All phoneme segments and lexical stress patterns are good." Each participant provided 14 or 28 utterances, and a random sampling of approximately 56% of these utterances were scored by the human raters based on the pronunciation rubric. Certainly, all of the utterances could have been scored by the human raters, but the study chose to only score a random sampling of the utterances to reduce labor costs. For each participant, the human-generated scores for the random sampling of the 14 or 28 utterances were averaged to arrive at a final human-generated score.

These utterances from 230 participants were also scored in accordance with the above-described PPM, PFM and LPP scoring methods, in which each of the utterances were first segmented into phrases, statistics were computed for each phrase, before the phrase-level results were aggregated into PPM, PFM and LPP results for each utterance. For each participant and for each type of machine scoring method (i.e., PPM, PFM, LPP), the machine-generated scores for the 14 or 28 utterances were averaged to arrive at a final machine-generated score.

As shown in FIG. 18A, PPM scores were highly correlated with human pronunciation scores across the sample size of 230 participants, with a Pearson's r of 0.865. As shown in FIG. 18B, PFM values were highly correlated with human pronunciation scores across the sample size of 230 participants, with a Pearson's r of 0.846. As shown in FIG. 18C, LPP values were highly correlated with human pronunciation scores across the sample size of 230 participants, with a Pearson's r of 0.847. In each of the scatter plots, a best fit line was computed and plotted using least squares regression. It is understood that each of the PPM, PFM and LPP values could be mapped to a corresponding score in the range of 0 to 5 through the respective best fit lines.

To complete the discussion of the present example, the PPM score of 0.23 corresponds to a human-generated score of about 0 (by way of the best fit line of FIG. 18A), indicating an utterance that is an "insufficient or irrelevant sample for rating." Similarly, the PFM score of 0.17 corresponds to a human-generated score of about 0 (by way of the best fit line of FIG. 18B), indicating an utterance that is an "insufficient or irrelevant sample for rating." Similarly, the LPP score of −6.6 corresponds to a human-generated score of about 0 (by way of the best fit line of FIG. 18C), indicating an utterance that is an "insufficient or irrelevant sample for rating."

While each of the PPM, PFM and LPP scores averaged across all phrases within individual utterances can be used to assess the speaker's pronunciation of over an utterance, it is noted that the PPM, PFM and LPP scores for individual phrases (or more generally for individual segments) can reveal a degree of confidence associated with each of the adapted transcription segments 118 corresponding to a respective acoustic signal segment 116. In the present example, and returning to FIG. 16, one can observe that the PPM, PFM and LPP values were higher for the phrase "anything" as compared to the other phrases, indicating a higher degree of confidence for the adapted transcription segment 118*d* corresponding to the phrase "anything" as compared to the other adapted transcription segments 118*a*-118*c*. Such confidence values could be used in the context of an automated agent in which the automated agent could request the speaker 12 to repeat a phrase for which the confidence of the associated adapted transcription segment 118 is low (as revealed by low PPM, PFM and LPP values). One can extend the concept of confidence values to different segmentation levels, for instance to words, in which the PPM, PFM and LPP values can likewise reveal the degree of confidence associated with the adapted transcription of individual words.

It is noted that while three separate pronunciation scores (i.e., PPM, PFM and LPP) have been described, it is understood that such pronunciation scores could be aggregated into a single overall pronunciation score (e.g., through a simple linear combination with weights, using machine learning, etc.). Further, it is noted that one or more of the above-described pronunciation scores can be combined with other pronunciation scores generated in accordance with known methods to arrive at other overall pronunciation scores. Other pronunciation scores may include the articulation rate, rate of speech, the ratio of the duration of inter-word pauses divided by the duration of speech plus duration of inter-word pauses, the average segmental duration probability of phonemes based on Librispeech native duration statistics, the averaged segmental duration probability for inter-word pauses based on Librispeech native duration statistics, etc.

While the present discussion and examples have been primarily concerned with pronunciation scores, it is noted that the present techniques can also be extended to the field of mispronunciation detection and diagnosis (MDD). In such field, the goal is to not only detect mispronunciation (which is related to the above discussion of pronunciation scoring), but to also provide feedback to the user on the phone level. For example, consistently low PPM, PFM and/or LPP scores for specific phones could indicate certain phones to be more likely pronounced incorrectly by a speaker, statistically. After accumulating enough data, the speech analysis system 20 may have high enough confidence to point out to the speaker 12 that he/she made significant mistakes for certain phones and recommend the speaker 12 pay more attention to those phones, etc.

Figure 19:
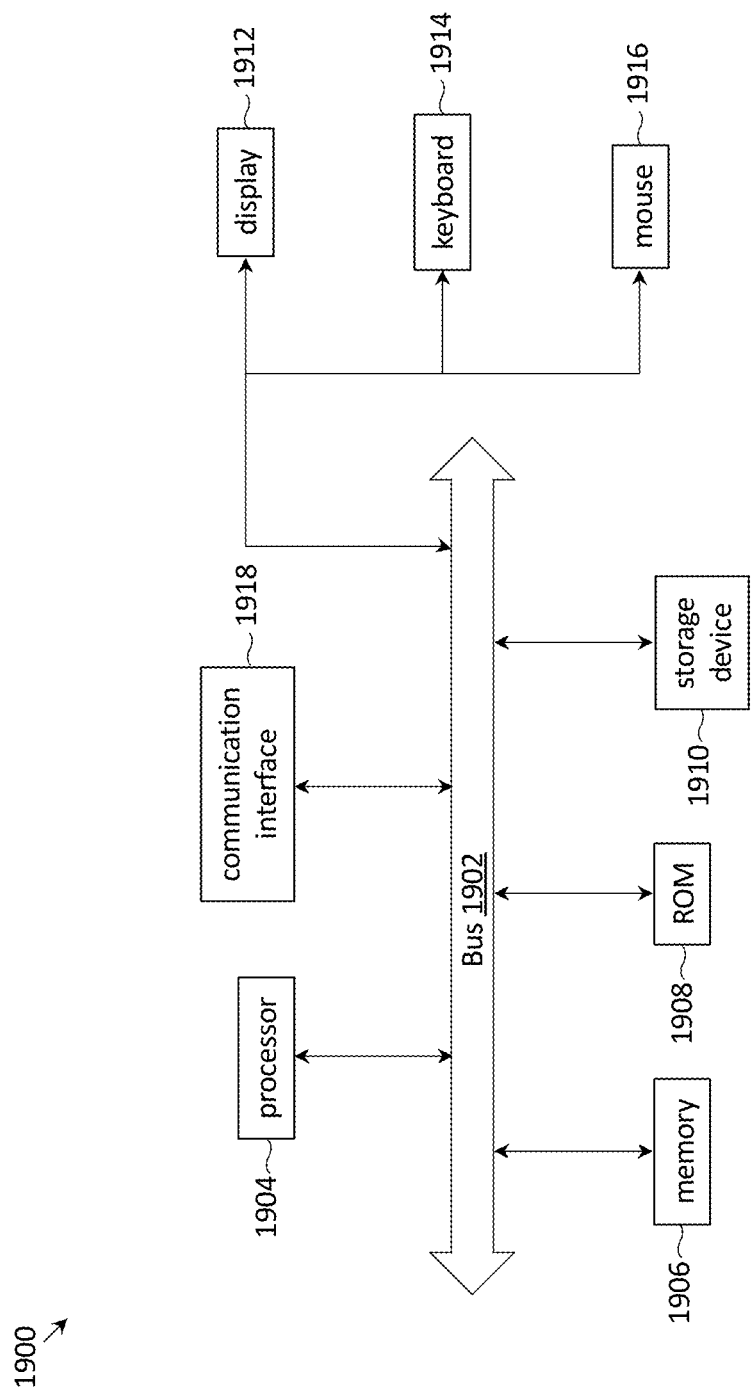
FIG. 19 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 19 provides an example of a system 1900 that may be representative of any of the computing systems (e.g., client device 16, server 22) discussed herein. Examples of system 1900 may include a smartphone, a desktop, a laptop, a mainframe computer, an embedded system, etc. Note, not all of the various computer systems have all of the features of system 1900. For example, certain ones of the computer systems discussed above may not include a display inasmuch as the display function may be provided by a client computer communicatively coupled to the computer system or a display function may be unnecessary. Such details are not critical to the present invention.

System 1900 includes a bus 1902 or other communication mechanism for communicating information, and a processor 1904 coupled with the bus 1902 for processing information. Computer system 1900 also includes a main memory 1906, such as a random access memory (RAM) or other dynamic storage device, coupled to the bus 1902 for storing information and instructions to be executed by processor 1904. Main memory 1906 also may be used for storing temporary variables or other intermediate information during execution of instructions to be executed by processor 1904. Computer system 1900 further includes a read only memory (ROM) 1908 or other static storage device coupled to the bus 1902 for storing static information and instructions for the processor 1904. A storage device 1910, for example a hard disk, flash memory-based storage medium, or other storage medium from which processor 1904 can read, is provided and coupled to the bus 1902 for storing information and instructions (e.g., operating systems, applications programs and the like).

Computer system 1900 may be coupled via the bus 1902 to a display 1912, such as a flat panel display, for displaying information to a computer user. An input device 1914, such as a keyboard including alphanumeric and other keys, may be coupled to the bus 1902 for communicating information and command selections to the processor 1904. Another type of user input device is cursor control device 1916, such as a mouse, a trackpad, or similar input device for communicating direction information and command selections to processor 1904 and for controlling cursor movement on the display 1912. Other user interface devices, such as microphones, speakers, etc. are not shown in detail but may be involved with the receipt of user input and/or presentation of output.

The processes referred to herein may be implemented by processor 1904 executing appropriate sequences of computer-readable instructions contained in main memory 1906. Such instructions may be read into main memory 1906 from another computer-readable medium, such as storage device 1910, and execution of the sequences of instructions contained in the main memory 1906 causes the processor 1904 to perform the associated actions. In alternative embodiments, hard-wired circuitry or firmware-controlled processing units may be used in place of or in combination with processor 1904 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as processing, computing, calculating, determining, displaying, receiving, transmitting or the like, refer to the action and processes of an appropriately programmed computer system, such as computer system 1900 or similar electronic computing device, that manipulates and transforms data represented as physical (electronic) quantities within its registers and memories into other data similarly represented as physical quantities within its memories or registers or other such information storage, transmission or display devices.

Computer system 1900 also includes a communication interface 1918 coupled to the bus 1902. Communication interface 1918 may provide a two-way data communication channel with a computer network, which provides connectivity to and among the various computer systems discussed above. For example, communication interface 1918 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1900 can send and receive messages and data through the communication interface 1918 and in that way communicate with hosts accessible via the Internet. It is noted that the components of system 1900 may be located in a single device or located in a plurality of physically and/or geographically distributed devices.

Thus, methods for evaluating the pronunciation of speech have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method for quantitatively evaluating a pronunciation of a speaker, the method comprising:
   receiving, by a computing system, an acoustic signal representing an utterance spoken in a language by the speaker;
   providing, by the computing system, the acoustic signal as an input to an acoustic model;
   generating, by the computing system, an adapted transcription as an output of the acoustic model based on processing the acoustic signal with the acoustic model, wherein the adapted transcription comprises a sequence of phones that represents how native or normative speakers of the language would likely speak the utterance;
   identifying, by the computing system, segment boundaries in the adapted transcription of the acoustic signal;
   segmenting, by the computing system, the adapted transcription into a plurality of adapted transcription segments based on the identified segment boundaries;
   segmenting, by the computing system, the acoustic signal into a plurality of acoustic signal segments based on the identified segment boundaries, each of the acoustic signal segments temporally corresponding to one of the adapted transcription segments;
   for each acoustic signal segments and its corresponding adapted transcription segment:
      generating, by the computing system, a high fidelity transcription segment corresponding to the acoustic signal segment, wherein the high fidelity transcription segment comprises a sequence of phones that represents how the native or normative speakers of the language would likely perceive a playback of the acoustic signal segment; and
      computing, by the computing system, statistics for the acoustic signal segment based on at least one of the high fidelity transcription segment and the adapted transcription segment; and
   computing, by the computing system, a pronunciation score by aggregating the statistics computed for the plurality of acoustic signal segments, the pronunciation score evaluating the pronunciation of the speaker.

2. The computer-implemented method of claim 1, wherein the acoustic model is trained using speech signals from the native speakers of the language and speech signals from non-native speakers of the language or the acoustic model is trained using speech signals from the normative speakers of the language and speech signals from non-normative speakers of the language.

3. The computer-implemented method of claim 2, wherein the adapted transcription of the acoustic signal is further generated using one or more a word-level language model or a word-piece level language model.

4. The computer-implemented method of claim 1, wherein the adapted transcription segments and the high fidelity transcription segments each comprises a plurality of phones, the plurality of phones comprising one or more of consonant phones or vowel phones.

5. The computer-implemented method of claim 1, wherein each of the phones from the adapted transcription is time aligned using the acoustic model, wherein the acoustic model is trained using speech signals from the native or normative speakers of the language.

6. The computer-implemented method of claim 1, wherein the segment boundaries are phone or word boundaries provided in the adapted transcription of the acoustic signal.

7. The computer-implemented method of claim 1, wherein the pronunciation score further evaluates the speaker's pronunciation of individual phones, the method further comprising alerting the speaker of certain ones of the phones for which the speaker's pronunciation was deficient.

8. The computer-implemented method of claim 1, wherein for each of the acoustic signal segments, one of the statistics of the acoustic signal segment reveals a degree of confidence associated with the adapted transcription segment corresponding to the acoustic signal segment.

9. The computer-implemented method of claim 1, wherein the high fidelity transcription segment is generated using a second acoustic model trained using speech signals from the native or normative speakers of the language.

10. The computer-implemented method of claim 9, wherein the high fidelity transcription segment is further generated using a phone sequence model, wherein the phone sequence model comprises a rule-based phone sequence model (RBPSM) or a statistical phone sequence model.

11. The computer-implemented method of claim 1, wherein computing the statistics comprises:
   determining whether a first phone of the high fidelity transcription segment matches a second phone from the adapted transcription segment;
   determining whether at least one frame number of the first phone is identical to at least one frame number of the second phone; and
   incrementing a counter whenever (i) the first phone of the high fidelity transcription segment matches the second phone from the adapted transcription segment, and (ii) at least one frame number of the first phone is identical to at least one frame number of the second phone.

12. The computer-implemented method of claim 11, wherein determining whether the first phone of the high fidelity transcription segment matches the second phone from the adapted transcription segment comprises determining whether one or more phonetic properties of the first phone matches one or more phonetic properties of the second phone, wherein the phonetic properties include one or more of phone stress or phone position.

13. The computer-implemented method of claim 1, wherein computing the statistics comprises incrementing a counter whenever a first frame from the high fidelity transcription segment and a second frame from the adapted transcription segment share a common phone and a common frame number.

14. The computer-implemented method of claim 1, wherein computing the statistics comprises incrementing a counter whenever a first frame from the high fidelity transcription segment and a second frame from the adapted transcription segment share a common phone with common phonetic properties and a common frame number, and wherein the phonetic properties include one or more of phone stress or phone position.

15. The computer-implemented method of claim 1, wherein computing the statistics for the acoustic signal segment comprises:
   for each frame of the adapted transcription segment, computing a log of a posterior probability of a phone identified in the frame of the adapted transcription segment, wherein the posterior probability of the phone is defined as a conditional probability of the phone given observations of the acoustic signal segment; and aggregating the plurality of log posterior probabilities into the statistic for the acoustic signal segment.

16. The computer-implementing method of claim 15, wherein the phone sequence model is a rule-based phone sequence model (RBPSM).

17. The computer-implemented method of claim 1, wherein computing the pronunciation score further comprises combining the aggregated statistics computed for the plurality of acoustic signal segments with other statistics regarding the acoustic signal.

18. The computer implemented method of claim 1, wherein the adapted transcription does not rely upon any prior knowledge of the utterance of the speaker.

19. A computer-implemented method for quantitatively evaluating a pronunciation of a speaker, the method comprising:

receiving, by a computing system, an acoustic signal representing an utterance spoken in a language by the speaker;

providing, by the computing system, the acoustic signal as an input to an acoustic model;

generating, by the computing system, an adapted transcription as an output of the acoustic model based on processing the acoustic signal with the acoustic model, wherein the adapted transcription comprises a sequence of phones that represents how native or normative speakers of the language would likely speak the utterance;

identifying, by the computing system, window boundaries in the adapted transcription of the acoustic signal;

windowing, by the computing system, the adapted transcription into a windowed adapted transcription based on the identified window boundaries;

windowing, by the computing system, the acoustic signal into a windowed acoustic signal based on the identified window boundaries;

generating, by the computing system, a high fidelity transcription corresponding to the windowed acoustic signal, wherein the high fidelity transcription comprises a sequence of phones that represents how the native or normative speakers of the language would likely perceive a playback of the acoustic signal; and computing, by the computing system, statistics for the windowed acoustic signal based on at least one of the high fidelity transcription and the windowed adapted transcription; and computing, by the computing system, a pronunciation score by aggregating the statistics computed for the windowed acoustic signal, the pronunciation score evaluating the pronunciation of the speaker.

20. The computer-implemented method of claim 19, wherein windowing the acoustic signal comprises removing a non-consonant-vowel phone from one or more of a beginning and an end of the acoustic signal.

* * * * *